(12) United States Patent
Sakamoto et al.

(10) Patent No.: US 6,836,418 B2
(45) Date of Patent: Dec. 28, 2004

(54) SLANT SHORT-PERIOD GRATING

(75) Inventors: Akira Sakamoto, Sakura (JP);
Masaaki Sudo, Sakura (JP); Reiko Kojima, Tokyo (JP); Tomosada Inada, Sakura (JP); Satoshi Okude, Sakura (JP); Kenji Nishide, Sakura (JP)

(73) Assignee: Fujikura Ltd., Tokyo (JP)

( * ) Notice: Subject to any disclaimer, the term of this patent is extended or adjusted under 35 U.S.C. 154(b) by 128 days.

(21) Appl. No.: 10/311,641

(22) PCT Filed: Jun. 18, 2001

(86) PCT No.: PCT/JP01/05168

§ 371 (c)(1),
(2), (4) Date: Dec. 17, 2002

(87) PCT Pub. No.: WO01/98803

PCT Pub. Date: Dec. 27, 2001

(65) Prior Publication Data

US 2003/0142912 A1 Jul. 31, 2003

(51) Int. Cl.[7] .............................. G02B 6/34; G02B 6/22
(52) U.S. Cl. ...................... 365/37; 385/123; 385/127; 430/290
(58) Field of Search .............................. 385/10, 15, 37, 385/123, 127; 430/290

(56) References Cited

U.S. PATENT DOCUMENTS

| | | | | |
|---|---|---|---|---|
| 5,949,934 A | | 9/1999 | Shima et al. | 385/37 |
| 5,953,471 A | * | 9/1999 | Espindola et al. | 385/37 |
| 6,137,924 A | | 10/2000 | Strasser et al. | 385/11 |
| 6,456,762 B1 | * | 9/2002 | Nishiki et al. | 385/37 |

FOREIGN PATENT DOCUMENTS

| | | | | |
|---|---|---|---|---|
| CA | 2201193 | 1/2001 | | G02B/5/18 |
| EP | 0962790 | 12/1999 | | G02B/6/16 |
| EP | 0962791 | 12/1999 | | G02B/6/16 |

(List continued on next page.)

OTHER PUBLICATIONS

M.J. Holmes, et al., "Novel Fibre Design for Narrow–Band Symmetric Response Sidetap Filters with Suppressed Leaky Mode Resonance", ECOC. Sep. 1999, I–216–I–217.

I. Riant, et al., "Gain equalization with optimized slanted Bragg grating on adapted fibre for multichannel long–haul submarine transmission", Alcatel Corporate Research Center, OFC '99, C–71a–71c, No date.

M.J. Holmes, et al., "Sidetap Optical Fibre Grating Filters" Trends in Optics and Photonics, vol. 33, pp. 204–209, Dec. 2000.

*Primary Examiner*—John D. Lee
(74) *Attorney, Agent, or Firm*—Darby & Darby

(57) ABSTRACT

There is provided a slant short-period grating which is obtainable by irradiating light onto an optical fiber whose core is formed from quartz glass to which has been doped a photosensitive dopant that changes a refractive index of the quartz glass by light irradiation, and whose clad has one or two or more layers with at least the layer that is adjacent to the core being a photosensitive layer formed from quartz glass to which has been doped a photosensitive dopant that changes a refractive index of the quartz glass by light irradiation. In this slant short-period grating a grating portion is formed by changing the refractive index of the photosensitive layer of the clad and the core at a predetermined grating period along a longitudinal direction of the optical fiber by a predetermined slant angle. The diameter of the core is set to 5 μm or more, and the relative photosensitivity ratio of the core relative to the photosensitive layer of the clad that is adjacent to the core is designed so as to satisfy a predetermined formula. As a result, in the wavelength spectrum of transmitted light, loss peaks are obtained in a narrow frequency band.

23 Claims, 28 Drawing Sheets

FOREIGN PATENT DOCUMENTS

| | | | | |
|---|---|---|---|---|
| EP | 0984306 | 3/2000 | ............ | G02B/6/16 |
| EP | 1022595 | 7/2000 | ............ | G02B/6/293 |
| EP | 1035425 | 9/2000 | ............ | G02B/6/10 |
| EP | 01061386 | 12/2000 | ............ | G02B/6/16 |
| FR | 2779237 | 12/1999 | ............ | G02B/5/28 |
| FR | 2779238 | 12/1999 | ............ | G02B/6/16 |
| FR | 3779239 | 12/1999 | ............ | G02B/6/16 |
| JP | 9-274115 | 10/1997 | ............ | G02B/6/12 |
| JP | 9-325227 | 12/1997 | ............ | G02B/6/12 |
| JP | 9-325229 | 12/1997 | ............ | G02B/6/122 |
| JP | 11-84117 | 3/1999 | ............ | G02B/5/18 |
| JP | 11-160554 | 6/1999 | ............ | G02B/6/10 |
| JP | 11-305051 | 11/1999 | ............ | G02B/6/10 |
| JP | 2000-9941 | 1/2000 | ............ | G02B/6/00 |
| JP | 2000-9956 | 1/2000 | ............ | G02B/6/22 |
| JP | 2000-89045 | 3/2000 | ............ | G02B/6/10 |
| JP | 2000-89055 | 3/2000 | ............ | G02B/6/17 |
| JP | 2000-266945 | 9/2000 | ............ | G02B/6/10 |
| WO | 99/27399 | 6/1999 | ............ | G02B/6/10 |

* cited by examiner

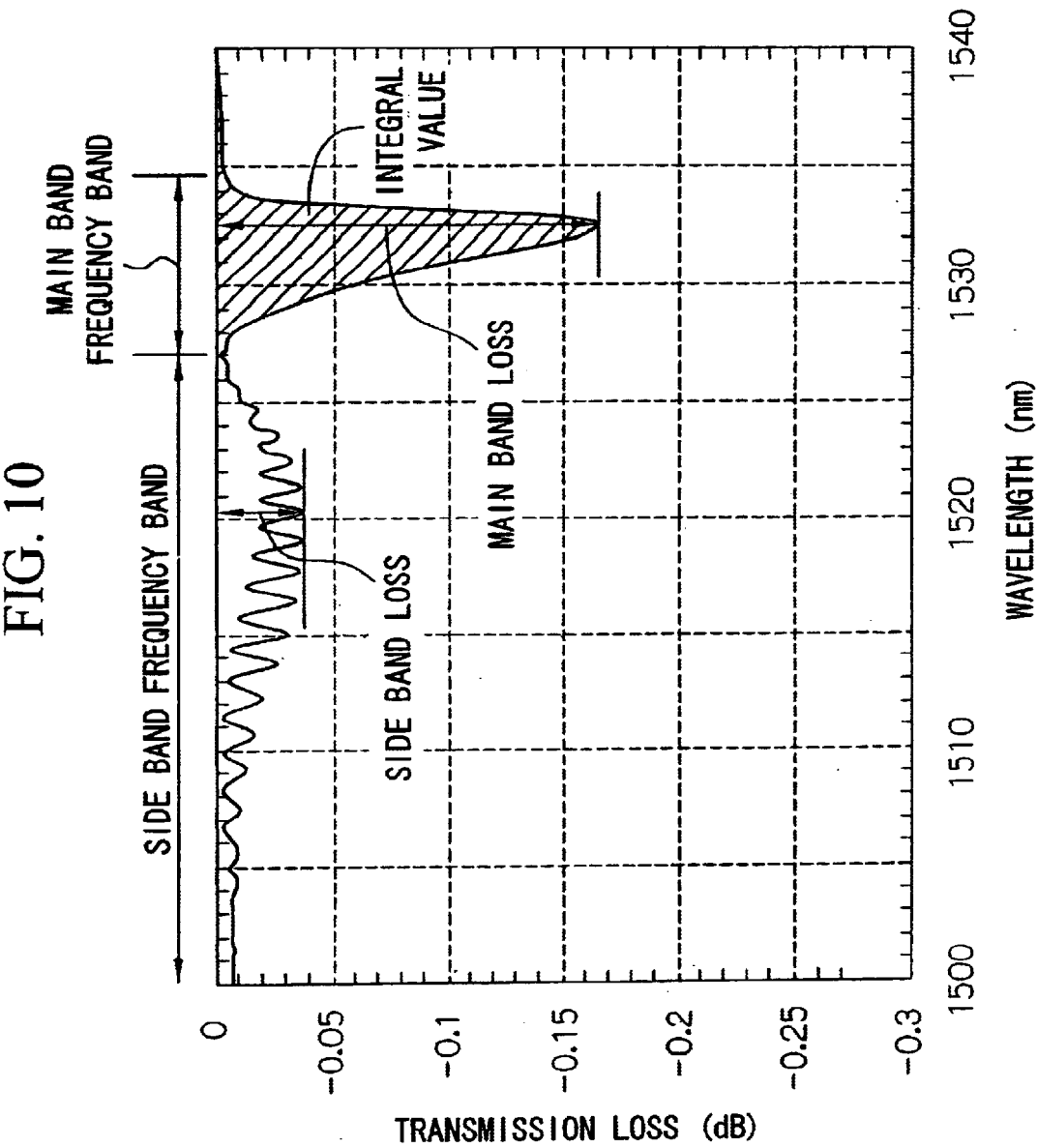

SLANT SHORT-PERIOD GRATING

TECHNICAL FIELD

The present invention relates to a slant short-period grating used as an optical filter or the like in the field of optical communications and the like.

This application is based on Patent Application No. 2000-183796 filed in Japan, the contents of which are incorporated herein by reference.

BACKGROUND ART

An optical fiber grating is one example of a fiber type of optical filter. There are long-period grating (LPG) and short-period grating (SPG) types of optical fiber grating.

Conventionally, an optical fiber grating is formed by changing the refractive index of a core at a predetermined grating period in the longitudinal direction of the core. Note that the term grating period refers to the period of this refractive index change. An LPG grating period is approximately several hundred $\mu$m.

In LPG, in a grating section in which a change in the refractive index is formed, light of a predetermined wavelength region from the incident light is coupled with a forward clad mode that moves forward in the same direction as the incident light, and transmitted light is obtained from which the light of this wavelength region has been lost.

In contrast to this, in SPG, the grating period is approximately one half to one third the wavelength of the light. Namely, if the operating wavelength is in the vicinity of 1.55 $\mu$m, then a value of, for example, approximately one third of this is set. As a result, the light of a predetermined wavelength region, from among waveguide modes that are propagated along the core of an optical fiber, is reflected and coupled with a reflection mode, and transmitted light is obtained from which this light has been lost.

LPG has the advantage that there are no micro ripples that cause degradation in the signal waveform. The term micro ripples refers to minute fluctuations in the wavelength spectrum of transmitted light when the horizontal axis is the wavelength and the vertical axis is the transmittance. Therefore, LPG enables a smooth characteristic to be obtained in the wavelength spectrum. A further advantage is that reflected light is practically non-existent.

However, LPG has the disadvantage of it being difficult to obtain arbitrary transmission characteristics due to the difficulty of adjusting the transmission characteristics.

In SPG, in addition to the amount of change in the refractive index of the grating portion and the grating period, by employing a chirped grating in which the grating period is changed by being gradually extended or shortened in the longitudinal direction thereof, it is possible to widen the wavelength region of the lost light and to adjust the intensity of the lost light, and it is possible to obtain arbitrary transmission characteristics comparatively freely.

However, in SPG, multiple reflections are generated by the action of reflected light, and as a result, micro ripples are generated in the wavelength spectrum of the transmitted light creating the problem of it not being possible to obtain smooth wavelength spectrum characteristics. There is also the problem that there is a large amount of reflected light.

For these reasons, recently, the freedom of design allowed by SPG has been used to further the development of slant SPG in which it is even more difficult for micro ripples to occur.

FIG. 24 is a side cross-sectional view showing an example of a slant SPG. A description will now be given of the production method for this slant SPG The symbol 1 in the drawing is a core. An optical fiber is formed by providing a clad 2 having a lower refractive index than the core 1 on the outer periphery of the core 1.

The core 1 and clad 2 are both formed from quartz glass. A photosensitive dopant that raises the refractive index of quartz glass when light of a specific wavelength is irradiated onto it is doped to the core 1. Normally, germanium is used as the photosensitive dopant. The refractive index is raised when ultraviolet light of approximately 240 nm is irradiated onto the germanium doped quartz glass.

Accordingly, when light is irradiated at a predetermined grating period in the longitudinal direction of the core 1 from one side surface of the optical fiber by the interposition of a phase mask or the like, the refractive index of that portion of the core 1 receiving the irradiated light is raised so that a grating portion 4 in which a plurality of high refractive index portions 3, 3, . . . are arranged at a predetermined grating period is obtained.

The high refractive index portions 3, 3, . . . are formed on an inclination so as to cut across the core 1 without being orthogonal to the center axis B of the core 1. Moreover, a plurality of high refractive index portions 3, 3, . . . are arranged parallel to each other in the longitudinal direction of the core 1. The direction of a line A that is perpendicular to a high refractive index portions 3 is known as the grating direction. Alternatively, this direction is known as the lattice vector direction of the grating portion.

An angle $\theta$ between the grating direction A and the center axis B of the core 1 is known as the slant angle. The size of the inclination of the refractive index portions 3 is represented by this angle $\theta$. Note that in normal SPG the grating direction matches the center axis of the core 1 so that the angle $\theta$ is zero.

As a result, light that moves along the core 1 in the same direction as that of the incident light and whose waveguide mode is reflected by the grating portion 4 is irradiated onto the clad 2, and couples with a reverse clad mode that is moving in the opposite direction to the incident light. Namely, because it does not couple with a reflection mode that moves in reverse along the core 1, it is difficult for multiple reflections to occur. It is therefore possible to reduce the intensity of the micro ripples obtained in the wavelength spectrum.

FIGS. 25A, 25B, 26A, and 26B show wavelength spectrums for various slant angles.

Because the waveguide mode couples with a plurality of reverse clad modes, in the waveguide spectrum a plurality of loss peaks are aligned adjacent to each other.

If the slant angle is increased from 0 degrees to 2.9 degrees, 4 degrees, and 5.8 degrees, then the coupling with the reflection mode of the waveguide modes is smallest at 4 degrees. When the slant angle is further increased to 5.8 degrees, then the coupling begins to increase again. Namely, periodic characteristics are demonstrated in which couplings with reflection modes repeatedly increase and decrease as the slant angle increases.

The angle at which the couplings with reflection modes first reach the minimum value is known as the reflection suppression angle (4 degrees in this example, as is shown in FIG. 26A).

In slant SPG if the slant angle is set in the vicinity of the reflection suppression angle, it is possible to reduce the effects of micro ripples.

However, in a slant SPG that uses a typical single mode optical fiber that has a core and clad having a lower refractive index than the core provided on the outer periphery of the core, with the core being formed from germanium doped quartz glass while the clad is formed from pure quartz glass, if the slant angle is set in the vicinity of the reflection suppression angle, the region where the waveguide mode couples with a clad mode is extended, creating the drawback that it is not possible to obtain a steep wavelength spectrum.

FIG. 27 shows an example of a wavelength spectrum of slant SPG transmitted light obtained when, in the core of the above type of typical single mode optical fiber, the slant short period grating portion is formed such that the slant angle is in the vicinity of the reflection suppression angle at a fixed grating period. The loss region (the region of peak loss) reaches as far as 20 nm or more.

Furthermore, in a slant SPG it is possible in some cases to make divisions into main bands, which are wavelength regions where a large loss peak is obtained in the transmitted light wavelength spectrum, and side bands, which are small wavelength regions that appear on the short wavelength side of the main bands. There are also cases in which unnecessary ghost mode peaks are present in portions of the long wavelength side of the main band loss peaks, and cases in which there is a large side band transmission loss that becomes noise that appears to be parallel to the main band loss peaks.

If ghost peaks are present, or if there is a large side band transmission loss, then essentially it is not possible to make the loss band sufficiently narrow, and, in some cases, a steep wavelength spectrum cannot be obtained.

Moreover, even if the same light exposure, namely, the same change in the refractive index is provided, if the area of the main band of the transmission loss (referred to below on occasion as "transmission loss area") is small, it is necessary to lengthen the exposure in order to obtain the same filter characteristics. This becomes a drawback during production.

Thus, in slant SPG, various problems exist such as difficulty of obtaining a steep wavelength spectrum, reducing the ghost mode peaks, reducing side band transmission loss, and increasing the transmission loss area. Accordingly, in some cases, it is difficult to obtain the desired characteristics, and there is still an insufficient degree of freedom allowed when designing optical characteristics. In particular, it has often been difficult to obtain a narrow loss band.

Slant SPG is used, for example, to equalize the wavelength—gain characteristics of erbium (Er) doped optical fiber amplifiers. Slant SPG that allows a variety of designs for dealing with the optical characteristics of the gain—wavelength characteristics of these Er doped optical fiber amplifiers is desirable. When slant SPG is used for the Er doped optical fiber amplifiers, it is preferable for the ghost modes and the side band transmission loss of the slant SPG not to generate problems.

The present invention was conceived in view of the above circumstances and it is one object of the present invention is to provide a slant SPG that enables the free designing of optical characteristics.

Specifically, one object of the present invention is to provide a slant SPG having a narrow loss band in a transmitted light wavelength spectrum. In addition, one object of the present invention is to provide a slant SPG that has a greater transmission loss area using the same refractive index change.

In addition, one object of the present invention is to provide a slant SPG in which ghost mode peaks are decreased. In addition, one object of the present invention is to provide a slant SPG that enables a reduction in side band transmission loss to be achieved.

DISCLOSURE OF INVENTION

In order to achieve the above aims, in the present invention the inventions described below are proposed.

The first aspect of the present invention is a slant short-period grating which is obtainable by irradiating light onto an optical fiber having a core and a clad provided on an outer periphery of the core, the core being formed from quartz glass to which has been doped a photosensitive dopant that changes a refractive index of the quartz glass by light irradiation, and the clad having one or two or more layers with at least the layer that is adjacent to the core being a photosensitive layer formed from quartz glass to which has been doped a photosensitive dopant that changes a refractive index of the quartz glass by light irradiation, and thereby a grating portion is formed by changing the refractive index of the photosensitive layer of the clad and the core at a predetermined grating period along a longitudinal direction of the optical fiber by a predetermined slant angle, wherein a diameter of the core is 5 μm or more;

wherein a relative photosensitivity ratio of the core relative to the photosensitive layer of the clad that is adjacent to the core satisfies Formula (1) below:

$$0.2 - 0.1 \cdot (V - 1.7) \leq P \leq 0.1a\{0.41 - 0.33 \cdot (V - 1.7)\} \tag{1}$$

in Formula (1), a is the diameter of the core in units of μm, V is a standardized frequency, and P is the relative photosensitivity ratio of the core relative to the photosensitive layer of the clad that is adjacent to the core; and wherein the slant angle is set to such an angle that loss due to coupling of a waveguide mode with a reflection mode is minimum.

The second aspect of the present invention is a slant short-period grating, in the slant short-period grating according to first aspect of the invention, wherein the diameter of the core is 7 μm or more.

The third aspect of the present invention is a slant short-period grating, in the slant short-period grating according to first aspect of the invention, wherein the relative photosensitive ratio of the core is 0.1 to 0.4.

The fourth aspect of the present invention is a slant short-period grating, in the slant short-period grating according to first aspect of the invention, wherein an outer diameter of the photosensitive layer of the clad is four times or more the diameter of the core.

The fifth aspect of the present invention is a slant short-period grating, in the slant short-period grating according to first aspect of the invention, wherein the diameter of the core is 12 μm or less.

The sixth aspect of the present invention is a slant short-period grating, in the slant short-period grating according to first aspect of the invention, wherein a comparative refractive index difference between the core and the clad is 0.5% or less.

The seventh aspect of the present invention is a slant short-period grating, in the slant short-period grating according to first aspect of the invention, wherein aluminum or phosphorous is doped to the core.

The eighth aspect of the present invention is a slant short-period grating which is obtainable by irradiating light onto an optical fiber having a core and a clad provided on an outer periphery of the core, the clad having one or two or more layers with at least one layer being a photosensitive layer formed from quartz glass to which has been doped a photosensitive dopant that changes a refractive index of the quartz glass by light irradiation, and thereby a grating portion is formed by changing the refractive index of the photosensitive layer at a predetermined grating period along a longitudinal direction of the optical fiber by a predetermined slant angle, wherein a relative photosensitivity ratio of the core relative to the photosensitive layer of the clad that has the highest photosensitivity satisfies Formula (2) below:

$$P \leq m_1(V-2)+m_2$$

$$m_1=0.0041667a^4-0.13519a^3+1.6206a^2-8.511a+16.291 \quad (2)$$

$$m_2=-0.00832827a^2+0.18344a-0.6912$$

however, when P equals 0 or smaller or is imaginary number, P is 0 in Formula (2), a is the diameter of the core in units of μm, V is a standardized frequency, and P is the relative photosensitivity ratio of the core relative to the photosensitive layer of the clad that has the highest photosensitivity.

The ninth aspect of the present invention is a slant short-period grating which is obtainable by irradiating light onto an optical fiber having a core and a clad provided on an outer periphery of the core, the clad having one or two or more layers with at least one layer being a photosensitive layer formed from quartz glass to which has been doped a photosensitive dopant that changes a refractive index of the quartz glass by light irradiation, and thereby a grating portion is formed by changing the refractive index of the photosensitive layer at a predetermined grating period along a longitudinal direction of the optical fiber by a predetermined slant angle, wherein a relative photosensitivity ratio of the core relative to the photosensitive layer of the clad that has the highest photosensitivity satisfies Formula (3) below:

$$P \geq (V-1.7868)^{0.048522}+0.17416V-1.121 \quad (3)$$

however, when P equals 0 or smaller or is imaginary number, P is 0 in Formula (3), a is the diameter of the core in units of μm, V is a standardized frequency, and P is the relative photosensitivity ratio of the core relative to the photosensitive layer of the clad that has the highest photosensitivity.

The tenth aspect of the present invention is a slant short-period grating which is obtainable by irradiating light onto an optical fiber having a core and a clad provided on an outer periphery of the core, the clad having one or two or more layers with at least one layer being a photosensitive layer formed from quartz glass to which has been doped a photosensitive dopant that changes a refractive index of the quartz glass by light irradiation, and thereby a grating portion is formed by changing the refractive index of the photosensitive layer at a predetermined grating period along a longitudinal direction of the optical fiber by a predetermined slant angle, wherein a relative photosensitivity ratio of the core relative to the photosensitive layer of the clad that has the highest photosensitivity satisfies Formula (4) below:

$$P \geq m1(a-m2)^{m3}$$

$$m1=-0.28947+0.17702V$$

$$m2=-344.28+543.53V-272.8V^2+44.494V^3 \quad (4)$$

$$m3=0.96687-0.24791V$$

however, when P equals 0 or smaller or is imaginary number, P is 0 in Formula (4), a is the diameter of the core in units of μm, V is a standardized frequency, and P is the relative photosensitivity ratio of the core relative to the photosensitive layer of the clad that has the highest photosensitivity.

The eleventh aspect of the present invention is a slant short-period grating, in the slant short-period grating according to any of the eighth to tenth aspects of the invention, wherein the slant angle is set such that loss due to coupling of a waveguide mode with a reflection mode is minimum.

The twelfth aspect of the present invention is a slant short-period grating, in the slant short-period grating according to any of the eighth to tenth aspects of the invention, wherein the relative photosensitivity ratio of the core relative to the photosensitive layer is 0.2 or more.

The thirteenth aspect of the present invention is a slant short-period grating, in the slant short-period grating according to any of the eighth to tenth aspects of the invention, wherein the grating period is a chirped pitch, and the chirping ratio of the grating period is 20 nm/cm or less.

The fourteenth aspect of the present invention is a slant short-period grating, in the slant short-period grating according to any of the first to tenth aspects of the invention, wherein a bend loss of an optical fiber under conditions of a wavelength of 1,550 nm and a winding diameter of 60 mm, is 1 dB/m or less.

The fifteenth aspect of the present invention is a slant short-period grating, in the slant short-period grating according to any of the first to tenth aspects of the invention, wherein a bend loss of an optical fiber in conditions of a wavelength of 1,550 nm and a winding diameter of 40 mm is 0.1 dB/m or less.

The sixteenth aspect of the present invention is a slant short-period grating, in the slant short-period grating according to any of the first to tenth aspects of the invention, wherein a mode field diameter of a waveguide mode of the optical fiber in an operating wavelength of the slant short-period fiber grating is 15 μm or less.

The seventeenth aspect of the present invention is a slant short-period grating, in the slant short-period grating according to any of the first to tenth aspects of the invention, wherein the outer diameter of the photosensitive layer is 1.5 times or more the size of the mode field diameter of a waveguide mode of the optical fiber in an operating wavelength of the slant short-period fiber grating The eighteenth aspect of the present invention is a slant short-period grating, in the slant short-period grating according to any of the first to tenth aspects of the invention, wherein the outer diameter of the photosensitive layer is 60 μm or less.

The nineteenth aspect of the present invention is a slant short-period grating, in the slant short-period grating according to any of the first to tenth aspects of the invention, wherein the length of the grating portion is 1 to 100 mm.

The twentieth aspect of the present invention is an optical amplifier module comprising the slant short-period grating according to any of the first to tenth aspects and an optical amplifier, wherein gain equalization of the optical amplifier is performed by the slant short-period grating.

The twenty-first aspect of the present invention is an optical amplifier module, in the optical amplifier module according to the twentieth aspect, wherein the optical amplifier is an erbium doped optical fiber amplifier.

The twenty-second aspect of the present invention is an optical communication system that employs the optical amplifier module according to the twentieth aspect.

The twenty-third aspect of the present invention is a manufacturing method for a slant short-period grating in which a slant short-period grating is designed and manufactured such that the conditions described in any of the first to tenth aspects are satisfied.

BRIEF DESCRIPTION OF DRAWINGS

FIG. 10 is a graph showing an example of the relationship between wavelength-transmission loss characteristics in the second embodiment.

BEST MODE FOR CARRYING OUT THE INVENTION

1. First Embodiment

The present inventors firstly conducted research aimed at achieving a narrow loss band.

A detailed description of the present invention will now be given following the research process of the present invention.

In the first embodiment, under conditions that can be applied to a slant SPG whose grating period is essentially fixed, the effects of "narrow loss band" and "side band loss peak suppression" are obtained.

As described above, in a slant SPG it is possible in some cases to make divisions into main bands, which are wavelength regions where a large loss peak is obtained in the transmitted light wavelength spectrum, and side bands, which are small wavelength regions that appear on the short wavelength side of the main bands.

Figure 28:
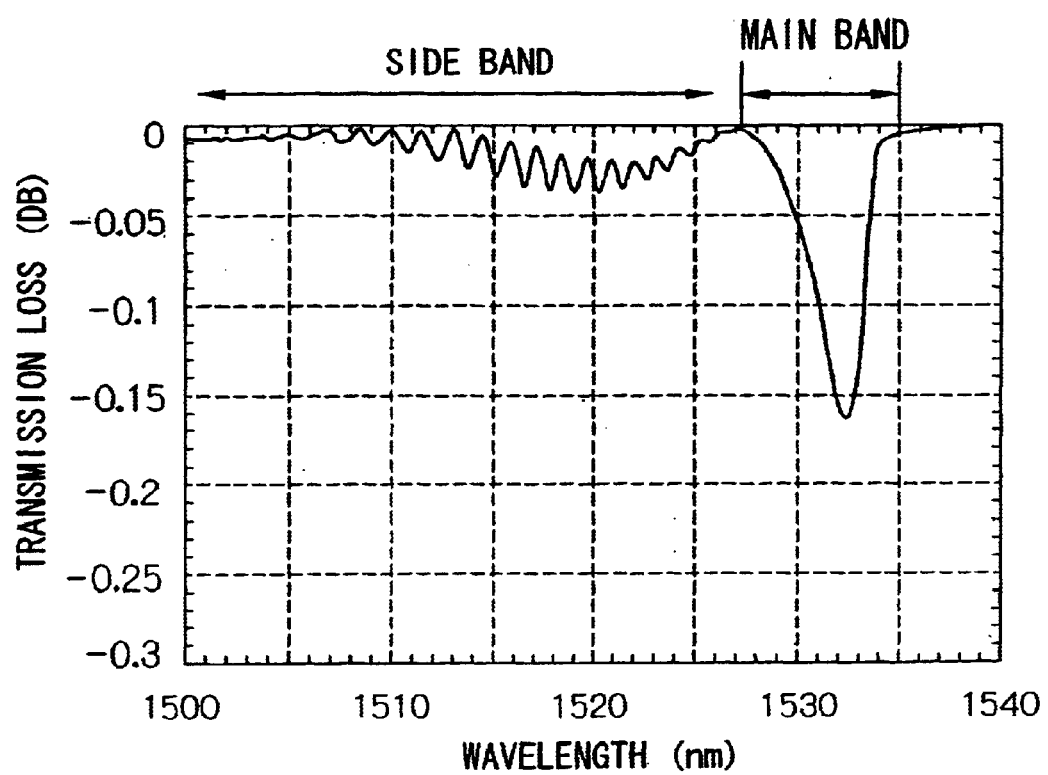
FIG. 28 is a graph showing an example of a wavelength spectrum of a slant SPG in which a side band and a main band are present.

FIG. 28 shows an example of a wavelength spectrum in which a main band and a side band are present. The long wavelength side is the main band, and the short wavelength side is the side band.

There are cases in an optical filter when transmission loss in the side band becomes noise, as is described above.

Moreover, the smaller loss ratio between transmission losses of the main band and the side band in the optical filter, the greater the degree of freedom in design. Therefore, a smaller loss ratio is preferable.

Accordingly, "side band loss peak suppression" is sought.

Figure 1:
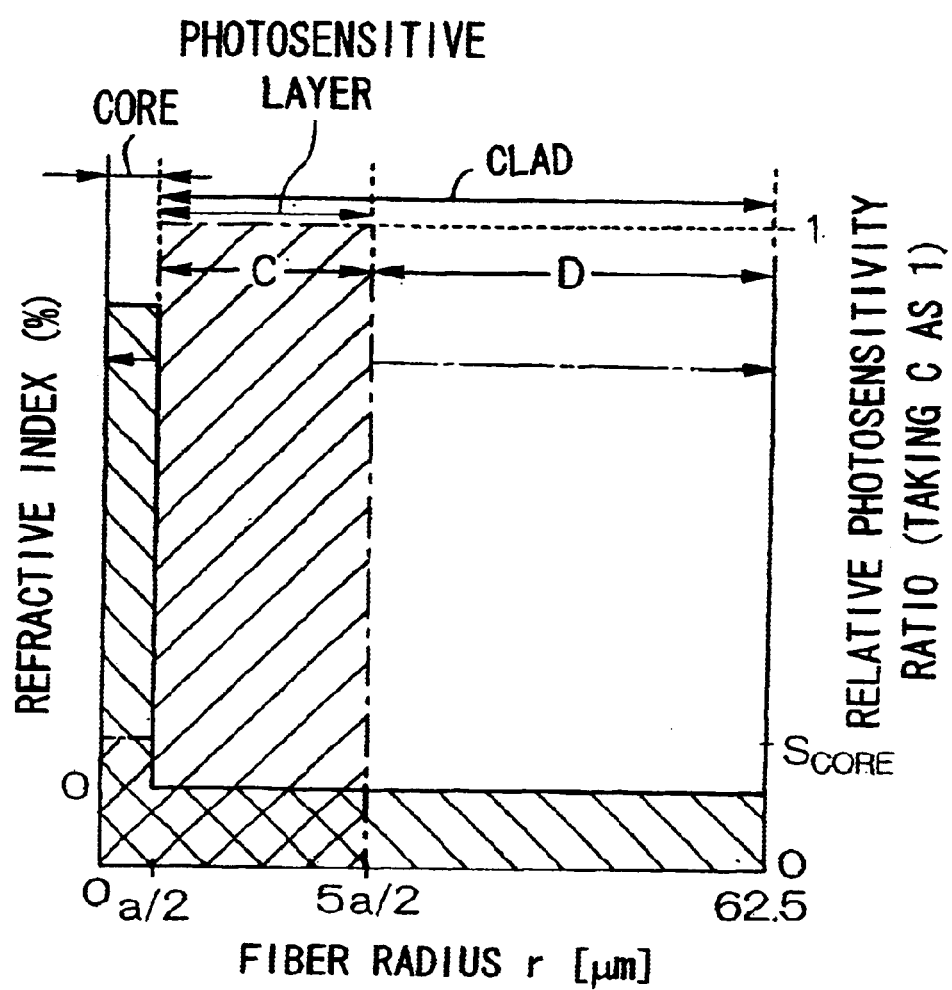
FIG. 1 is a graph showing design conditions for an optical fiber refractive index profile and a relative photosensitivity ratio profile.

FIG. 1 shows design conditions of three parameters that are the diameter a of a core, a standardized frequency V, and a relative photosensitivity ratio P of a core relative to a photosensitive layer adjacent to the core in the clad.

As is shown in FIG. 1, the clad is formed by a first layer C adjacent to the core, and a second layer D on the outer periphery thereof. The first layer C is a photosensitive layer formed from quartz glass to which a photosensitive dopant has been doped.

In this example, the radius of the first layer C is 5 times the core radius a/2. The radius of the clad is 62.5 μm.

In these design conditions a description is given of what kind of effect the aforementioned three parameters have on the frequency band of the main band, and on the ratio of side band loss to main band loss.

In the graph, the refractive index profile of the optical fiber is enclosed by a solid line.

In the refractive index profile, the core is set to have the highest refractive index, while the first layer of clad C and the second layer of clad D are set the same. Note that it is not absolutely necessary for the refractive indexes of the first layer C and the second layer D to match, and cases such as the refractive index of the first layer C being higher, or conversely, the refractive index of the second layer D being set higher may also be considered.

The photosensitivity profile is expressed with the relative photosensitivity ratio shown on the vertical axis as a reference, and is enclosed by a dot—dash chain line.

In this profile the greatest amount of photosensitive dopant is doped to the first layer C.

The relative photosensitivity ratio is the ratio of the amount of photosensitive dopant doped to other layers (i.e., other layers forming the core or the clad; in this example, the core and the second layer D) when the concentration of photosensitive dopant in the photosensitive layer to which the greatest amount of photosensitive dopant has been doped (in this example, the first layer C) is taken as 1.

Note that it is not necessary for the concentration of photosensitive dopant to be constant inside the core. If there are varying amounts of concentration of photosensitive dopant inside the core, the relative photosensitivity ratio is calculated from the average dopant concentration inside the whole core.

As can be understood from FIG. 1, in this embodiment a small amount of photosensitive dopant is doped to the core, and no photosensitive dopant is doped to the second layer D.

In the conventional example, an example is shown in which photosensitive dopant is doped only to the core, however, in this embodiment photosensitive dopant is doped mainly to the first layer of clad C, while a small amount of photosensitive dopant is further doped to the core.

Germanium is doped to the core in order to adjust the relative photosensitivity ratio, while phosphorous, aluminum, and the like are doped in order to adjust the refractive index.

Phosphorous and aluminum are dopants that have no photosensitivity and also act to raise the refractive index.

Germanium is doped to the first layer of clad C in order to adjust the photosensitivity thereof, while boron, fluorine, and the like may be doped if necessary in order to adjust the refractive index thereof.

The second layer D is formed from pure quartz glass or from quartz glass to which boron, fluorine, or the like has been doped in order to adjust the refractive index thereof.

In this embodiment, the diameters of the three cores examined were 7, 8, and 10 μm.

The standardized frequency V is determined by the following formula using the diameter of the core and the comparative refractive index difference between the core and the clad:

$$V = \frac{2\pi}{\lambda} \cdot \frac{a}{2} \cdot n_{core} \cdot \sqrt{2\Delta}$$

$$\Delta = \frac{n_{core}^2 - n_{clad}^2}{2n_{core}^2}$$

In the formula: $\lambda$ is the operating wavelength; a is the diameter of the core in units of μm; $n_{clad}$ is the refractive index of the clad; $n_{core}$ is the refractive index of the core, and $\Delta$ is the comparative refractive index difference between the refractive index of the clad and the refractive index of the core. The standardized frequency V varies within a range between 1.7 and 2.3.

The relative photosensitivity ratio of the core varies within a range between 0 to 0.4.

Note that, in the present embodiment the operating wavelength of the slant SPG is 1,500 to 1,600 nm.

Firstly, after values are set for the diameter of the core, the standardized frequency, and the relative photosensitivity ratio of the core, the slant angle is set to the first angle (reflection suppression angle) at which the loss caused by the coupling of the waveguide mode with the reflection mode (reverse LP01 mode) reaches the minimum value (normally approximately 0 to 0.01 dB) when the slant angle is gradually made larger starting from 0 degrees. Accordingly, in the present embodiment there is almost no coupling with the reflection mode. The slant angle may differ due to other conditions; however, the slant angle is between 1.5 and 8 degrees, and preferably between 1.5 and 6 degrees.

Next, the effective refractive index and the coupling coefficient are calculated for the coupling of the waveguide mode with an LP0X mode group and the coupling of the waveguide mode with an LP1X mode group. The LP0X mode group and the LP1X mode group are clad mode groups that form main bands and side bands.

These effective refractive index and coupling coefficient are then converted into the coupled wavelength (the wavelength when the waveguide mode is coupled with the clad mode) and transmission loss obtained when the slant SPG is made with an operating wavelength of 1,550 nm and a fixed grating period by using mode coupling theory to find the sum of the transmission loss generated by each coupling.

Figure 2:
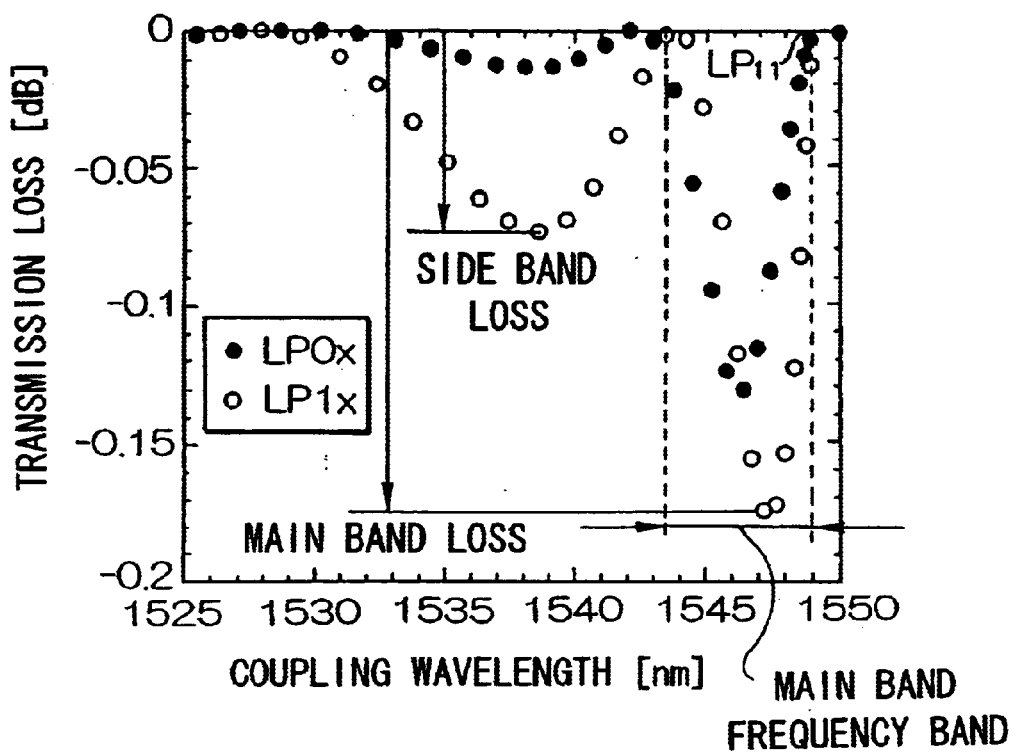
FIG. 2 is a graph showing an example of a result of a calculation of coupled wavelength and transmission loss in the first embodiment.

FIG. 2 is a graph showing an example of a calculation result. The symbol ● represents points when the wavelength (coupled wavelength) obtained by coupling the LP0X mode (LP01, LP02 . . . ) and the waveguide mode and the transmission loss at this time are plotted. The symbol ○ represents points when the wavelength (coupled wavelength) obtained by coupling the LP1X mode (LP11, LP12 . . . ) (X is an integer) and the waveguide mode and the transmission loss at this time are plotted.

The loss frequency band of the main band (i.e., the main band frequency band) is the width from the coupled wavelength of the LP11 mode appearing on the longest wavelength side of the main band to the coupled wavelength of the first LP1X mode in which the loss is at the minimum.

FIGS. 3A to 5B show results obtained when the main band frequency band and the side band/main band loss are determined by performing calculations under various conditions that are set by changing the diameter a of the core, the standardized frequency V, and the relative photosensitivity ratio P of the core, and, in the same way, by determining the slant angle (reflection suppression angle) when the coupling with the reflection mode is at the minimum.

Figure 3A:
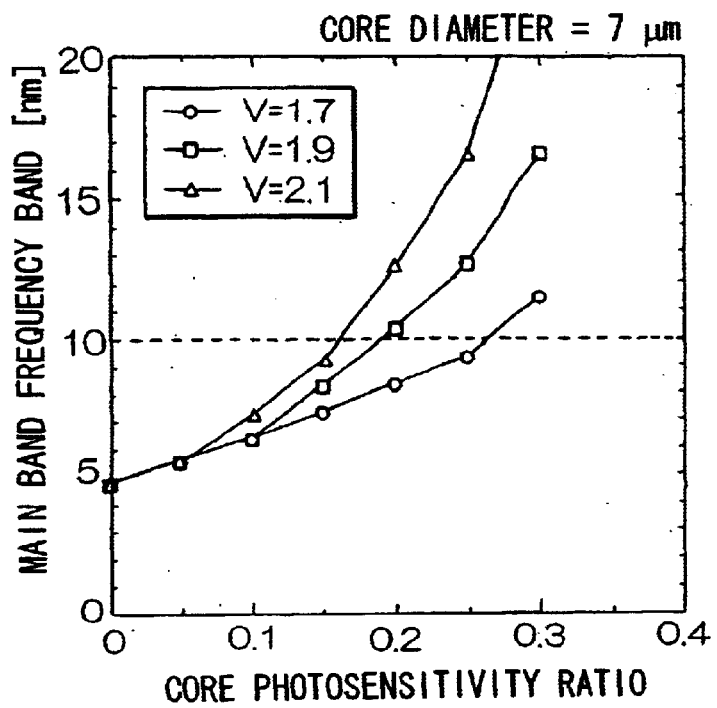
FIGS. 3A and 3B are graphs showing a relationship between a relative photosensitivity ratio of a core and a main band frequency band, and a relationship between a relative photosensitivity ratio of a core and a side band/main band loss ratio according to the first embodiment.
Figure 3B:
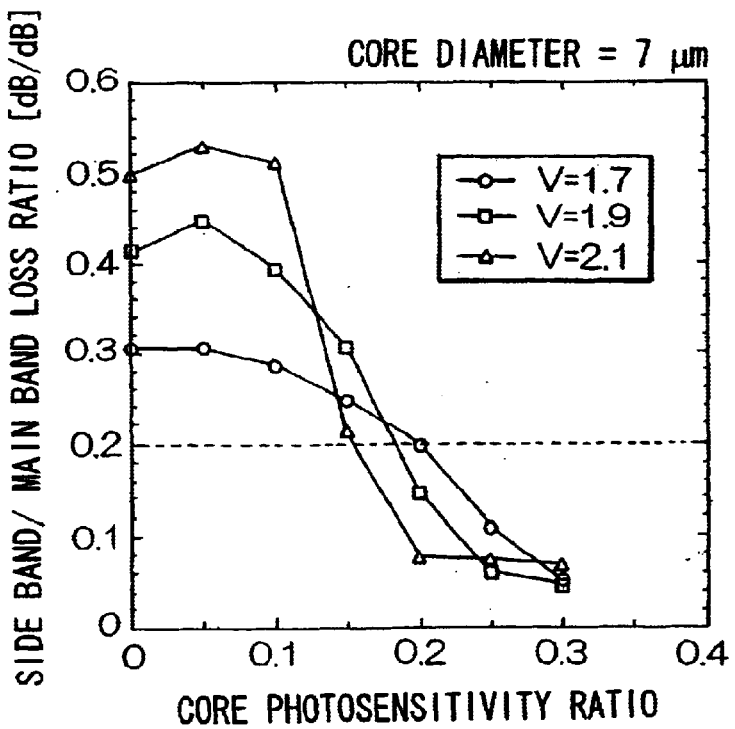

FIGS. 3A and 3B are graphs showing a relationship between a relative photosensitivity ratio of a core and a main band frequency band when the diameter of the core is 7 μm, and a relationship between a relative photosensitivity ratio of the core and a side band/main band loss ratio when the diameter of the core is 7 μm.

The results are grouped for each standardized frequency.

Figure 4A:
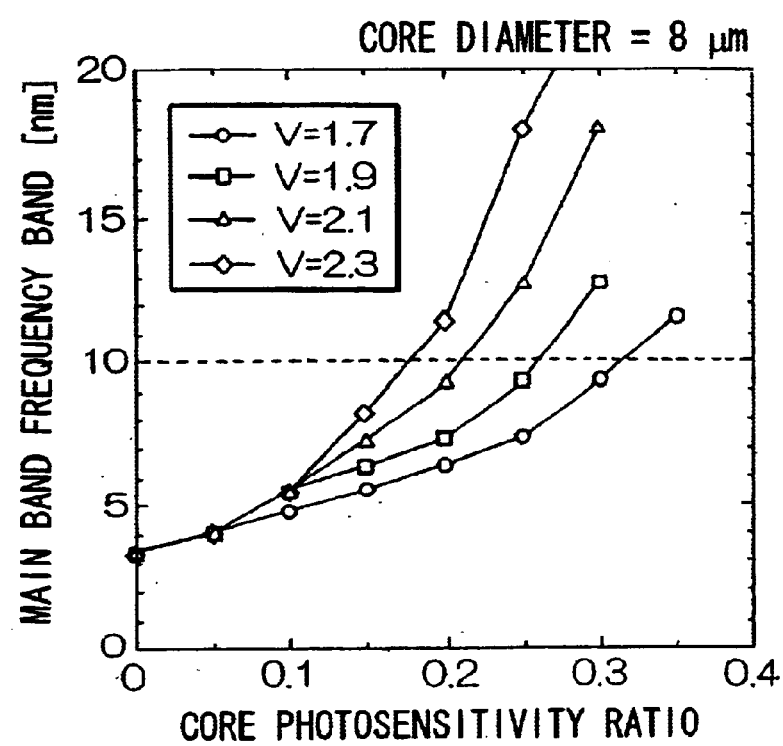
FIGS. 4A and 4B are graphs showing a relationship between a relative photosensitivity ratio of a core and a main band frequency band, and a relationship between a relative photosensitivity ratio of a core and a side band/main band loss ratio according to the first embodiment.
Figure 4B:
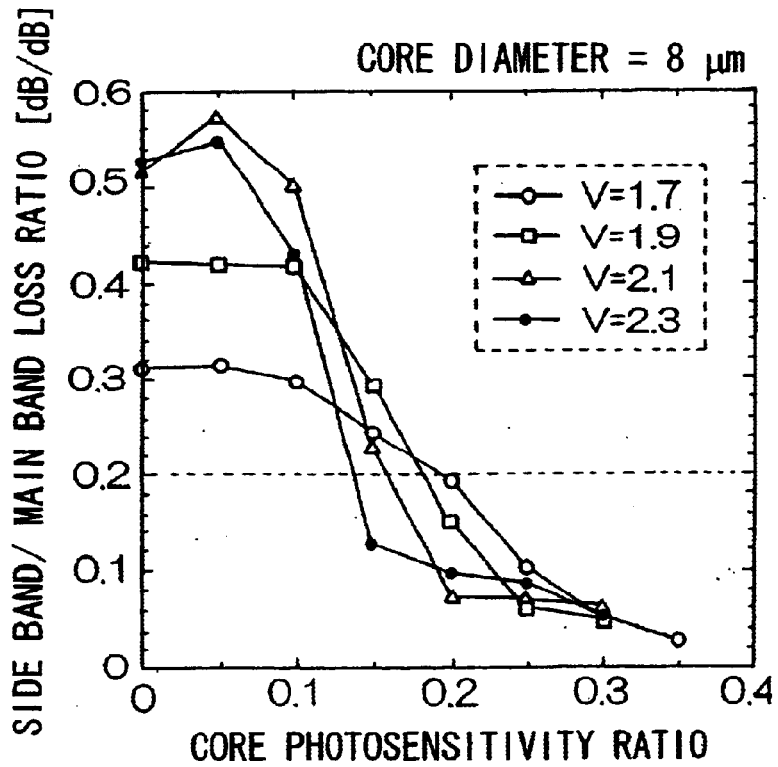

FIGS. 4A and 4B are graphs showing the same relationships when the diameter of the core is 8 μm.

Figure 5A:
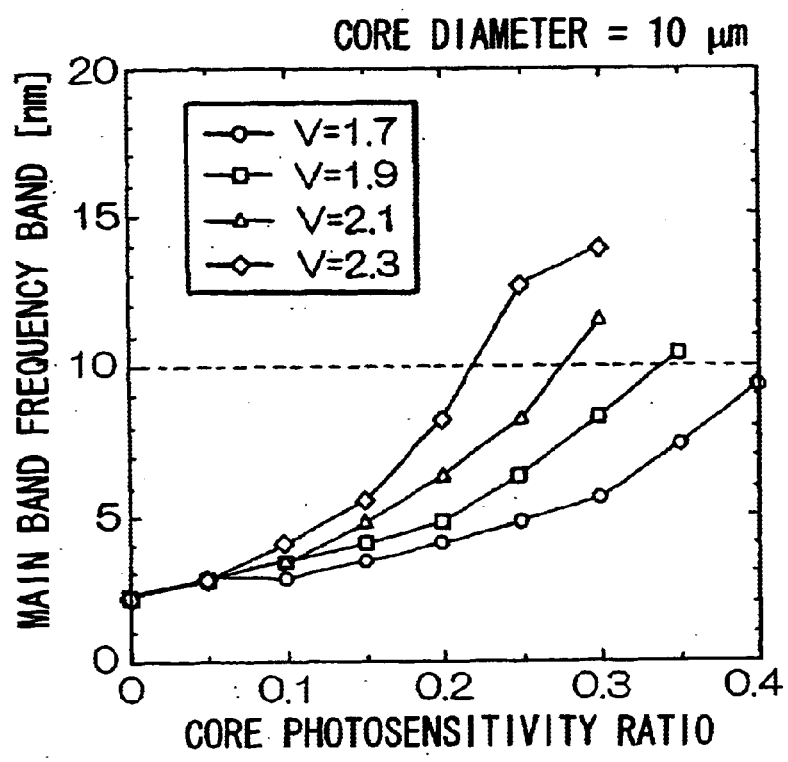
FIGS. 5A and 5B are graphs showing a relationship between a relative photosensitivity ratio of a core and a main band frequency band, and a relationship between a relative photosensitivity ratio of a core and a side band/main band loss ratio according to the first embodiment.
Figure 5B:
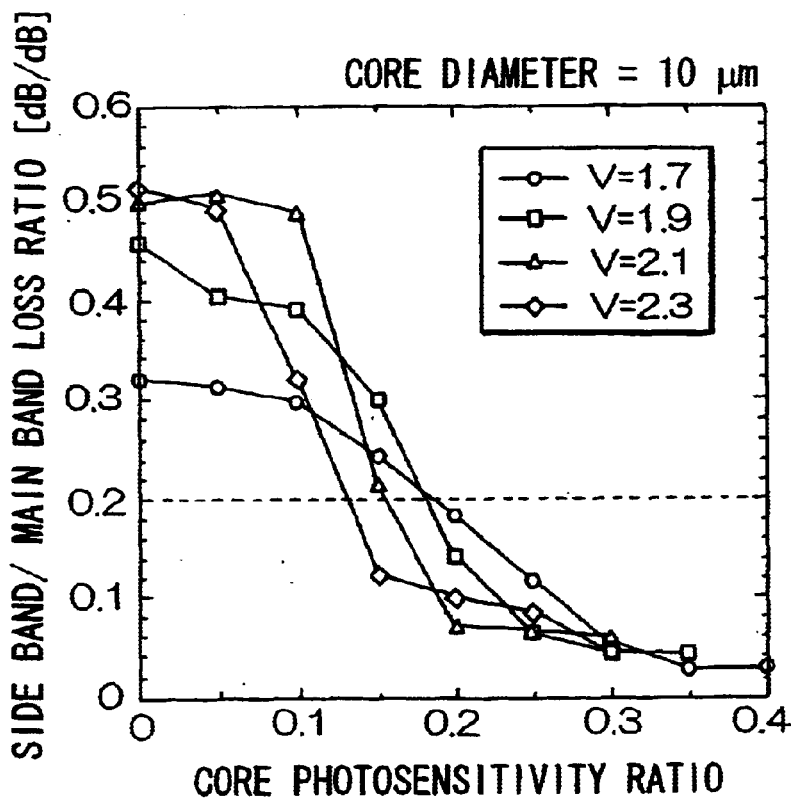

FIGS. 5A and 5B are graphs showing the same relationships when the diameter of the core is 10 μm.

Note that the main band loss is the top value of the peak of the main band transmission loss, and the side band loss is the top value of the peak of the side band transmission loss.

It can be seen from these graphs that the main band frequency band increases as the relative photosensitivity ratio of the core increases.

Namely, because the amount of change in the refractive index increases as the relative photosensitivity ratio of the core increases, coupling with the reflection mode tends to occur easily. Accordingly, in order to prevent this, it is necessary to increase the slant angle. In addition, because there is a tendency for the main band frequency band to increase as the slant angle increases, the result of this is that there is a large main band frequency band.

The main band frequency band also depends to a comparatively large extent on the diameter of the core and the standardized frequency. There is a tendency for the main band frequency band to become narrower as the diameter of the core increases, and to become narrower as the standardized frequency V becomes smaller.

Namely, there is a tendency for light to spread out over the cross section of the fiber as the diameter of the core increases. Moreover, if the standardized frequency becomes smaller while the diameter of the core remains the same, the core-clad comparative refractive index difference becomes smaller and, in the same way, there is a tendency for the light to spread out.

In a slant SPG there is also a dependency of the periodic structure on the direction of the fiber cross section, however, the phase matching conditions in the direction of the cross section are also constrained by the spreading out of the light. As a result, coupling with the reflection mode is reduced even when the slant angle is small, and it is possible to narrow the main band.

Moreover, the side band/main band loss ratio becomes smaller as the relative photosensitivity ratio of the core increases. The reason for this is given below.

Figure 6:
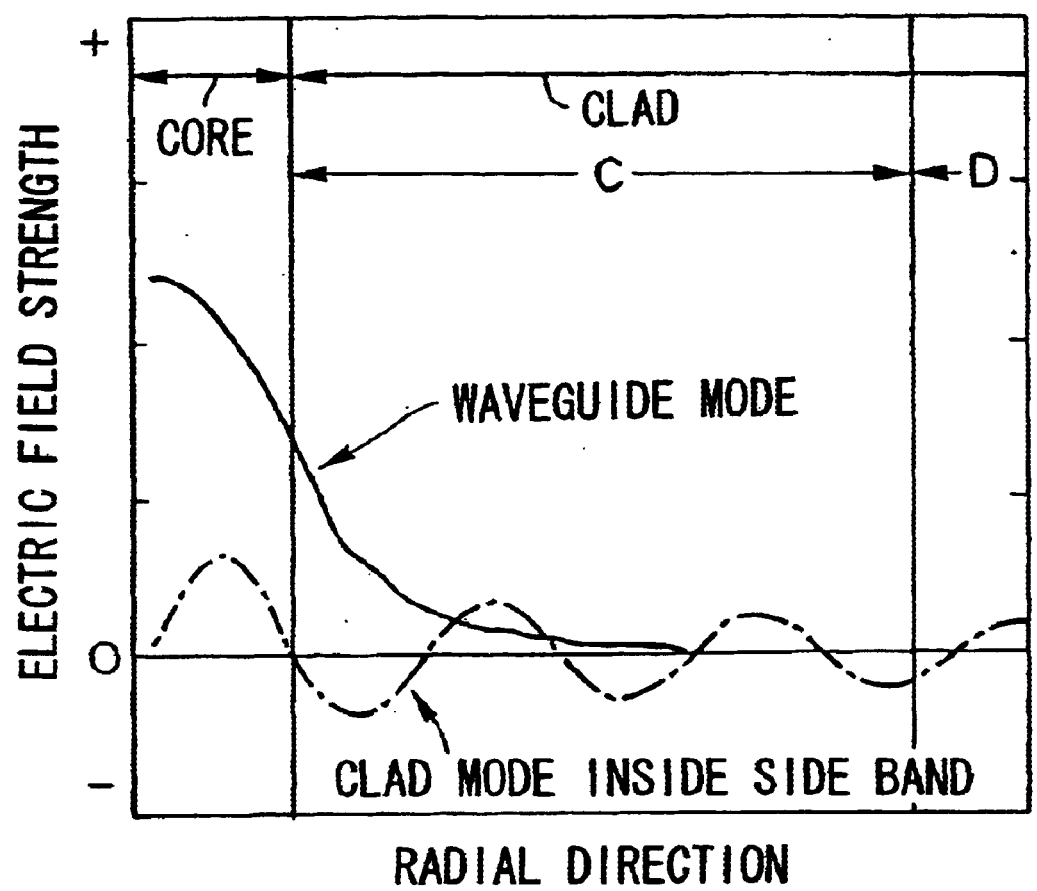
FIG. 6 is a graph showing the electric field strength of a clad mode forming a side band.

FIG. 6 shows the electric field strength of a clad mode forming a side band. The electric field strength of the waveguide mode is also shown.

On the clad side in the vicinity of the boundary between the core and the clad, the waveguide mode has a comparatively strong positive electric field strength, while the clad mode within the side band has a negative electric field strength and is in the opposite direction. Accordingly, the coupling coefficient is a negative value. In contrast, on the core side, the waveguide mode and the clad mode have the same positive electric field strength, and are in the same direction. The overlap between these two modes has a positive value on the core side. Accordingly, if a grating is formed in the core, then the overlap is offset by the core side and the clad side, and the coupling coefficient is reduced.

The side band/main band loss ratio is not particularly dependent on the diameter of the core and the standardized frequency, and there is a tendency for the side band/main band loss ratio to become greatly reduced whatever the conditions if the relative photosensitivity ratio of the core is in the vicinity of 0.2.

On the basis of these premises, slant SPG conditions that are actually feasible and that the objects of the present invention to be achieved are a main band frequency band of 10 nm or less, and a side band/main band loss ratio of 0.2 or less. It is naturally to be understood that conventionally these slant SPG conditions have not been achieved. By providing a slant SPG with properties such as these the effect is obtained that the degree of freedom in design when manufacturing an optical filter is increased. In addition, when applied to a gain equalizer (abbreviated below to GEQ) that flattens (i.e., equalizes) gain in an erbium doped optical fiber amplifier (abbreviated below to EDFA), the effect is obtained that the gain equalization residue can be reduced.

Figure 7:
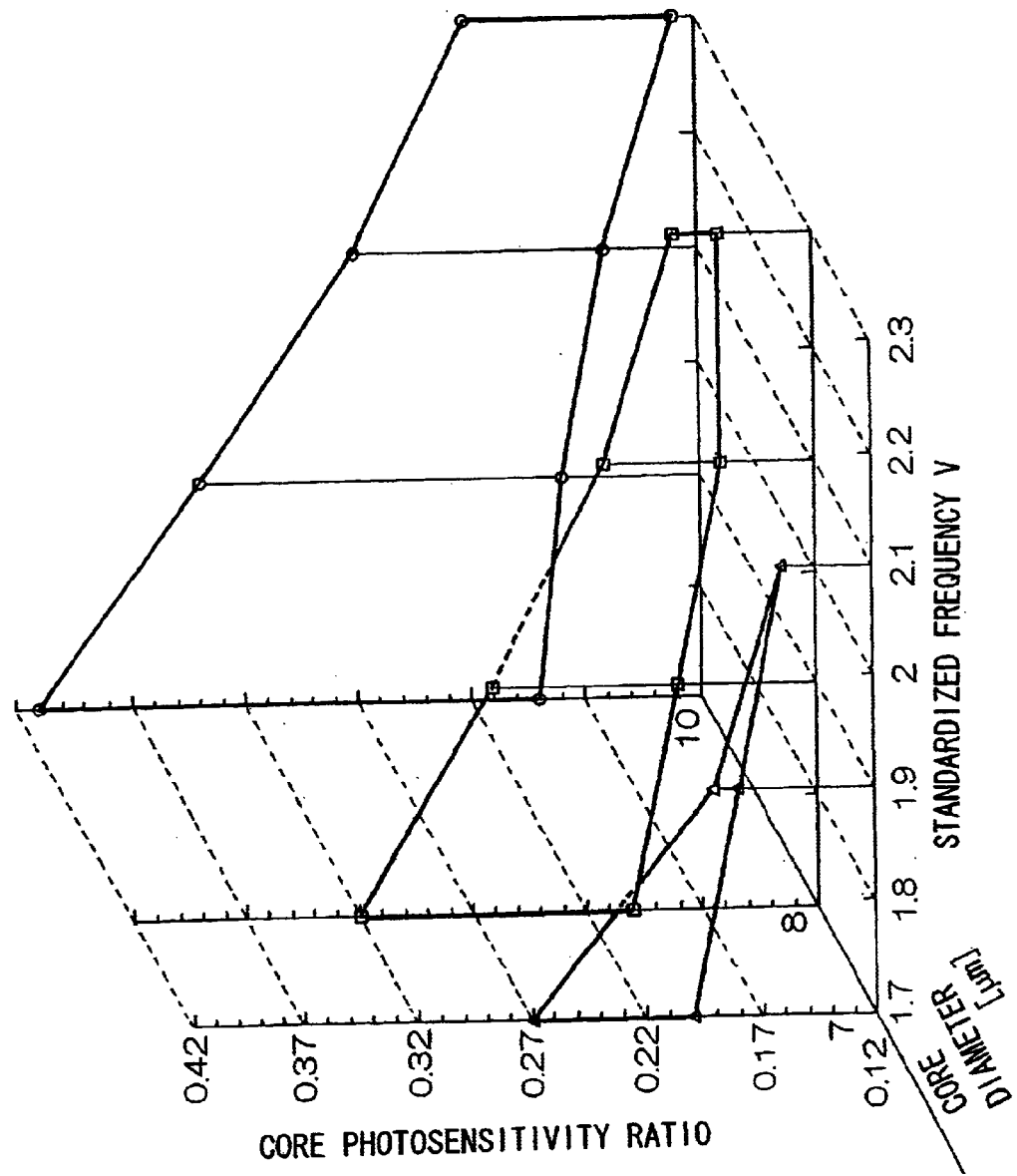
FIG. 7 is a graph showing ranges of three parameters that fulfill the characteristics of the slant SPG of the first embodiment.

Furthermore, when trying to determine a range that satisfies this range from the relationship between the diameter of the core, the relative photosensitivity ratio of the core, and the standardized frequency, the range shown in FIG. 7 may be proposed.

Note that, in this calculation example, a range of 7 μm or greater is sought, however, essentially, this range is one in which the diameter of the core is 5 μm or more and in which the above Formula (1) is satisfied.

Figure 8:
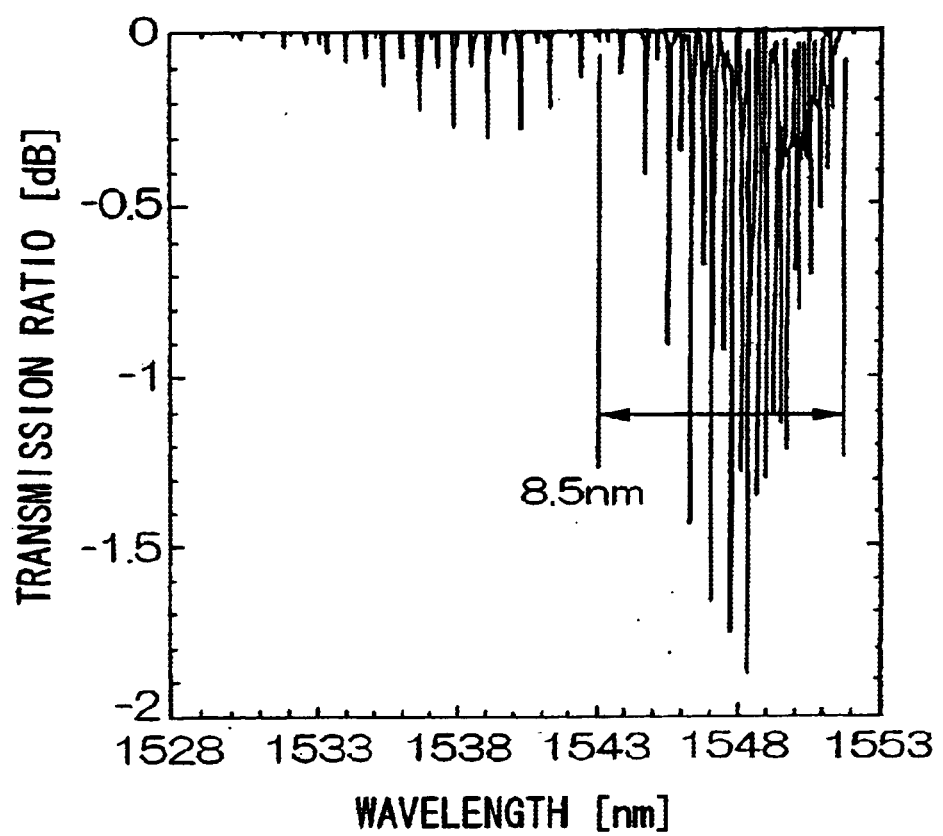
FIG. 8 is a graph showing an example of a wavelength spectrum of transmitted light of the slant SPG of the first embodiment.

FIG. 8 shows an example of a wavelength spectrum of transmitted light of a slant SPG produced under conditions such as these.

It can be seen that preferable characteristics are obtained, namely, the main band frequency band is a narrow 8.5 nm, and the side band/main band loss ratio is a small 0.18.

In this slant SPG, the core is formed from quartz glass to which germanium and aluminum have been doped, the first layer C of clad is formed from quartz glass to which germanium and fluorine have been doped, and the second layer D of clad is formed from quartz glass to which fluorine has been doped.

The relative photosensitivity ratio of the core is 0.18, and the standardized frequency is 2.3. In addition, the diameter of the core is 10 μm, the core-clad comparative refractive index difference is 0.3%, the outer diameter of the photosensitive layer of the clad is 40 μm, the clad diameter is 125 μm, the mode field diameter is 12 μm, the Bragg wavelength is 1,550 nm, the grating period is 536 nm, the grating length (i.e., the length of the grating portion) is 10 mm, the slant angle is 3 degrees, and the bend loss of a roll diameter of 60 mm is 0.02 dB.

The conditions for the slant SPG of the present embodiment are a core diameter of 5 μm or more, and preferably of 7 μm or more, and that the above Formula (1) is satisfied, however, it is also desirable that the condition below is satisfied.

Namely, it is preferable that the relative photosensitivity ratio of the core is between 0.1 to 0.4. If the relative photosensitivity ratio of the core is outside this range, then it may not be possible, in some cases, to obtain the desired characteristics.

Moreover, it is also desirable from the viewpoint of enabling a sufficient transmission loss to be obtained that the outer diameter of the photosensitive layer of the clad is 4 times or more the diameter a of the core.

It is also preferable that the diameter of the core is 12 µm or less. If the diameter of the core exceeds 12 µm, then problems are caused by the bend loss being too great. Moreover, the desired characteristics may not be able to be obtained.

Furthermore, in the range shown in FIG. 7, the core-clad comparative refractive index difference is 0.5% or less. Essentially, it is desirable that it be between 0.2 and 0.4%. If it exceeds 0.5%, the desired characteristics may not be able to be obtained.

It is also desirable that, in the operating wavelength, preferably in a wavelength of 1,550 nm, the bend loss of the optical fiber forming the grating is I dB/m or less at a roll diameter of 60 mm. More preferable is a bend loss in conditions of a wavelength of 1,550 nm and a roll diameter of 40 mm of 0.1 dB/m or less, most preferable of 0.01 dB/m or less.

If the bend loss is too large, then problems occur such as the ease of handling deteriorating when the optical fiber is housed in a module.

Furthermore, it is preferable that the mode field diameter of the waveguide mode in the operating wavelength (in the present embodiment 1500 to 1600 nm and preferably 1500 nm) of the optical fiber used in the slant SPG is 15 µm or less. If it exceeds 15 µm the light confinement is weak and the loss is high, leading to cases where it is not suitable for actual use. There is also the concern that there will be a large connection loss if the optical fiber is connected to another optical fiber.

The bend loss and the mode field diameter are greatly affected by the diameter of the core. The larger the diameter of the core, the greater the bend loss. Moreover, the mode field diameter also becomes larger. Therefore, it is desirable that the diameter of the core is 12 µm or less, as is described above.

In the slant SPG of the present embodiment the grating period is approximately one third to one half the operating wavelength and are set depending on the desired characteristics. However, in order to obtain a narrow main band frequency band, it is desirable that the grating period is a fixed period. Moreover, if the grating period is a fixed period, it is desirable that the grating length is short. If the grating period is too long, the spectrum coupled with each clad mode is too narrow, and there is a tendency for the ripples to become larger. There are no particular limits, however, the grating length is preferably between 1 and 100 mm or less, and more preferably 5 mm or less.

If the grating length is less than 1 mm, the concern arises that the grating length will be too short and the required transmission loss will not be able to be obtained. If the grating length exceeds 100 mm, the concern arises that not only will formation of the grating portion be difficult, but also that the device will be too large which will cause problems when the device is housed in a module or the like.

Because the grating length has an effect on the optical characteristics such as the filter frequency band, the transmission loss, and the like, it is preferable that the grating length is suitably adjusted while considering the desired characteristics.

It is also preferable that the outer diameter of the photosensitive layer of the clad is 1.5 times or more the mode field diameter of the waveguide mode of the operating wavelength (1,500 nm to 1,600 nm in the present embodiment and preferably 1,500 nm) of this slant SPG. There is no particular restriction as to the upper limit value; however, it is practically set at 8 times or less.

If the above value is less than 1.5 times, because the grating portion of the photosensitive layer is not formed in the area where the waveguide mode is propagated, there are times when sufficient loss peaks cannot be obtained.

Once these conditions have been satisfied it is desirable that the outer diameter of the photosensitive layer of the clad is 60 µm or less.

Because there is a tendency for the photosensitive layer to absorb light of a specific wavelength that is irradiated thereon during formation of the grating, if the outer diameter of the photosensitive layer is too large, when light is irradiated from the side surface of the optical fiber, the necessary and sufficient light is not irradiated onto the portion of the photosensitive layer located on the opposite side to the light irradiation surface. As a result of this, it is not possible for the refractive index to be raised sufficiently and, in some cases, the change in the refractive index is not uniform.

Providing the clad is provided with a photosensitive layer, this may be one layer or may be a multilayered structure formed from two or more layers, however, from the viewpoint of manufacturability a multilayered structure of two or more layers is preferable.

Furthermore, it is possible to alter as is appropriate conditions such as the doping amounts of photosensitive dopant and dopant for adjusting the refractive index in accordance with the design conditions.

Moreover, in the present embodiment it is possible to manufacture the optical fiber used in the slant SPG by a known method such as the VAD method, the MCVD method, the PCVD method, or the like. The grating portion may be manufactured by a known method using an excimer laser or the like as the light source.

In this way, in the slant SPG of the present embodiment, because the main band frequency band is narrow and the side band loss is small in the transmitted light wavelength spectrum, a loss peak is obtained in a narrow frequency band.

Note that it is possible to reliably manufacture a slant SPG having the desired characteristics if the slant SPG is designed and manufactured in accordance with the above described procedure.

2. Second Embodiment

The first embodiment is preferably applied when the grating period is a fixed period, however, there are cases when it is not always possible to achieve a satisfactory effect when it is applied to a chirped pitch in which the grating period changes. In order to enlarge the degree of freedom in the design conditions, for example, after a narrow loss frequency band has been set, it is preferable for it to be possible to further apply the present invention to a chirped pitch and make further fine adjustments.

The second embodiment is able to be applied without any distinction being made between when the grating period is a fixed period and when there is a chirped pitch.

2-1. Conditions for Obtaining a Narrow Loss Frequency Band:

Firstly, the present inventors investigated conditions that would enable a main band frequency band to be narrowed.

As is described above, if the main band frequency band is narrow and the side band loss is comparatively small, then it is possible to narrow the loss frequency band.

In the present embodiment as well, slant SPGS were manufactured under a variety of conditions using an optical fiber having the structure shown in FIG. 1. The characteristics of these were then compared.

Note that the grating period of the slant SPG of the present embodiment also depends on conditions such as the operating wavelength and the like, however, the grating period may be set, for example, to approximately one third to one half the operating wavelength. In the case of a chirped grating, it is sufficient if the chirping ratio is greater than 0 and the chirping ratio may be set, for example, to 20 nm/cm or less, and preferably to 0.2 to 10 nm/cm. The chirping ratio shows the ratio of the changed grating period in the longitudinal direction of the optical fiber. In particular, when the chirping ratio is 20 nm/cm or less, then at a grating length of approximately 7 mm it is possible to satisfactorily cover the 40 nm band, which is the frequency band normally required for gain equalization in order to equalize the gain of a C-Band or Er doped optical fiber amplifier.

Note also that a chirped pitch is one whose grating period is gradually changed so as to become extended or contracted in the longitudinal direction of the optical fiber. For example, provided that the following are known; namely, the grating length, the grating period which is the reference for the grating period in the center in the longitudinal direction of the grating portion and the like, the chirping ratio, and whether or not the grating period is gradually extended or contracted, then it is possible to specify the layout state of the high refractive index portion of the grating portion.

In the present embodiment, under the design conditions shown in FIG. 1, the radius of the outer diameter of the first layer C used in the investigation is 15 $\mu$m and the radius of the clad is 62.5 $\mu$m.

Furthermore, both the first layer C and the second layer D are formed from quartz glass. Germanium is doped to the core and to the first layer C, and the present embodiment is the same as the first embodiment in that other dopants may also be doped to each layer if required.

Note that, in the first embodiment, it is essential that a photosensitive dopant is doped to the core, however, in the second embodiment, provided that the conditions of Formula (2) are satisfied as is described below, then there are cases in which a photosensitive dopant may not be doped to the core.

Moreover, in the first embodiment, it is necessary that the photosensitive layer of the clad be adjacent to the core, however, in the second embodiment, it is not essential that it be adjacent to the core, and, in the graph shown in FIG. 1, it is possible, for example, for the second layer D to be made the photosensitive layer, or to form the clad with three or more layers and to make a central layer thereof the photosensitive layer.

In the present embodiment, the effects of the three parameters given below on the optical characteristics were investigated. Namely, ① the diameter a of the core
② the standardized frequency V, and
③ the relative photosensitivity ratio P of the core to the photosensitive layer of the clad.

The details of these investigations are described below.

Note that, in the second embodiment, the relative photosensitivity ratio P of the core is the relative photosensitivity ratio of the core to that photosensitive layer of the clad that has the highest photosensitivity.

Namely, in the second embodiment, it is possible to provide the clad with two or more photosensitive layers. The relative photosensitivity ratio of the core represents the relative ratio to that photosensitive layer that has the highest photosensitivity (i.e., whose concentration of doped photosensitive dopant is the highest) from among the photosensitive layers.

The various numerical ranges investigated were as follows:

① the diameter a of the core: 4 to 10 $\mu$m
② the standardized frequency V: 1.7 to 2.3
③ the relative photosensitivity ratio P of the core to the photosensitive layer of the clad: 0 to 0.3

Note that, in the present embodiment, the operating wavelength of the slant SPG is 1,550 nm.

Figure 24:
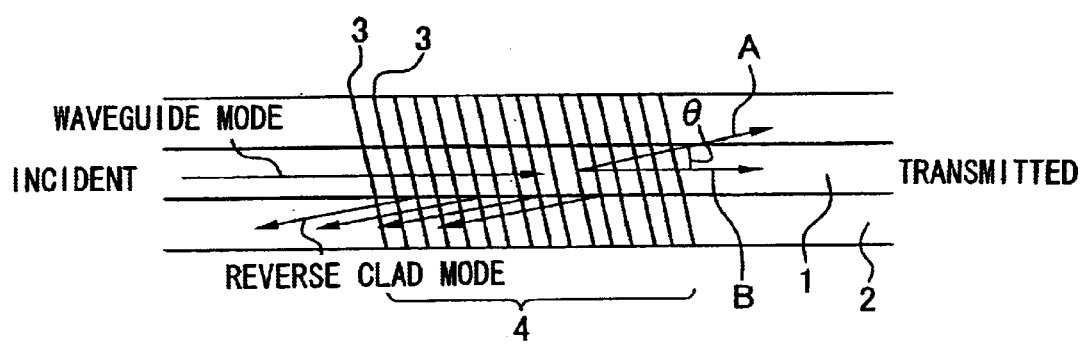
FIG. 24 is an explanatory view showing an example of the structure of a slant SPG.
Figure 25A:
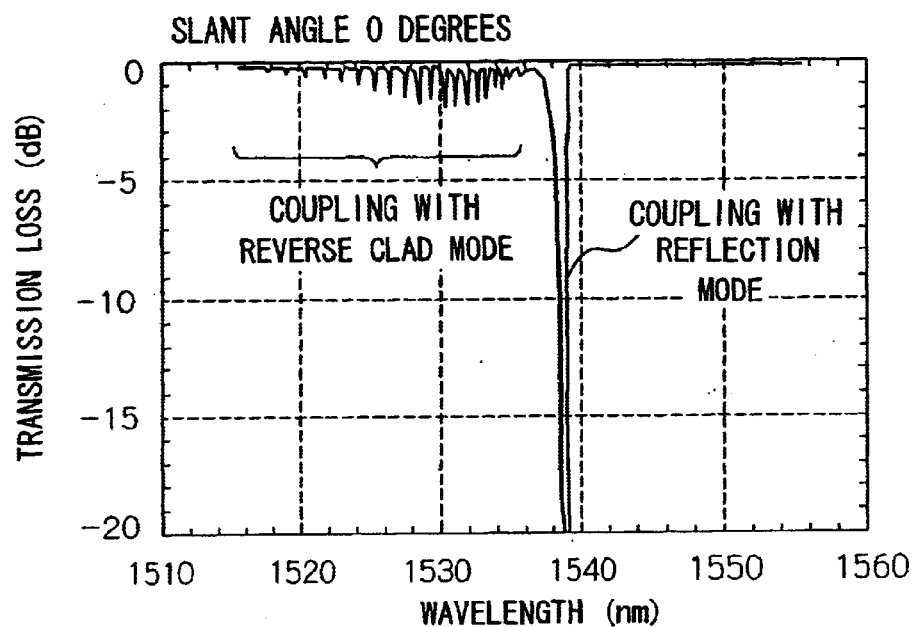
FIGS. 25A and 25B are graphs showing examples of a slant SPG wavelength spectrum when the slant angle is changed.
Figure 25B:
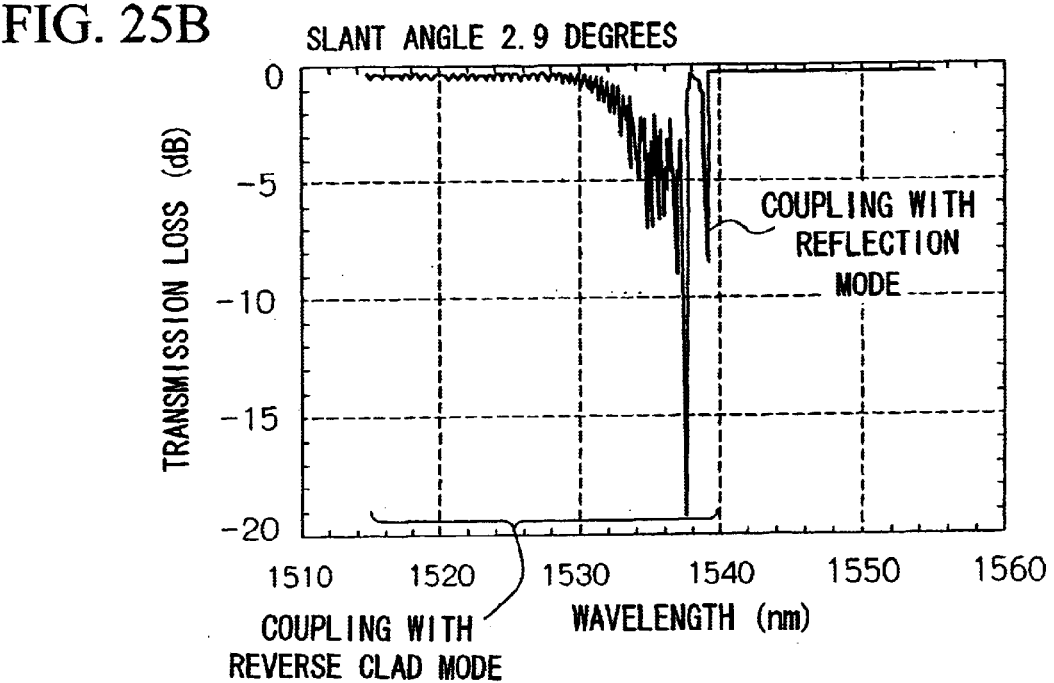
Figure 26A:
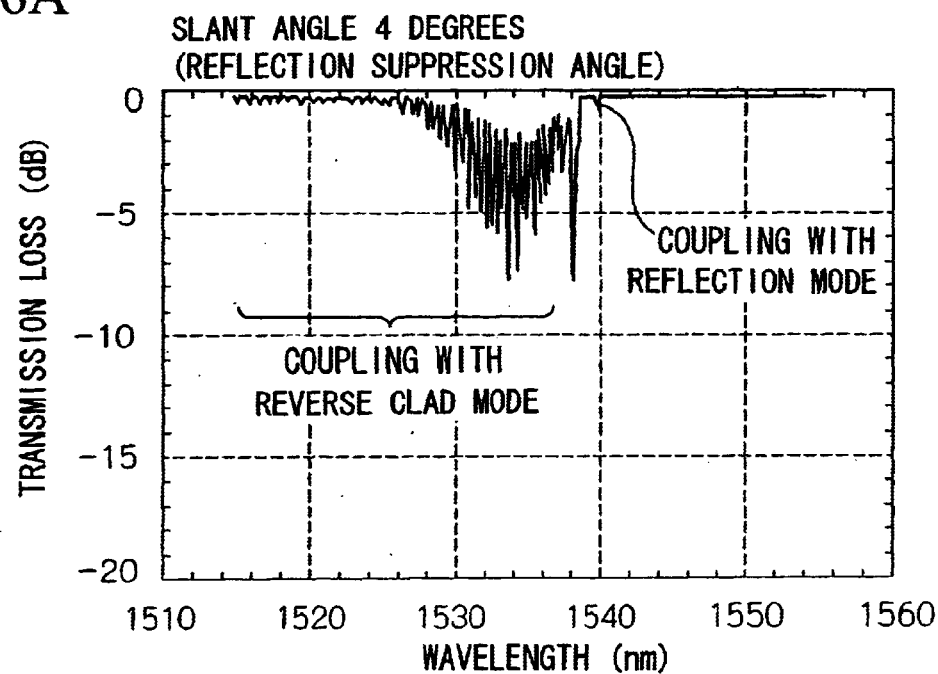
FIGS. 26A and 26B are graphs showing examples of a slant SPG wavelength spectrum when the slant angle is changed.
Figure 26B:
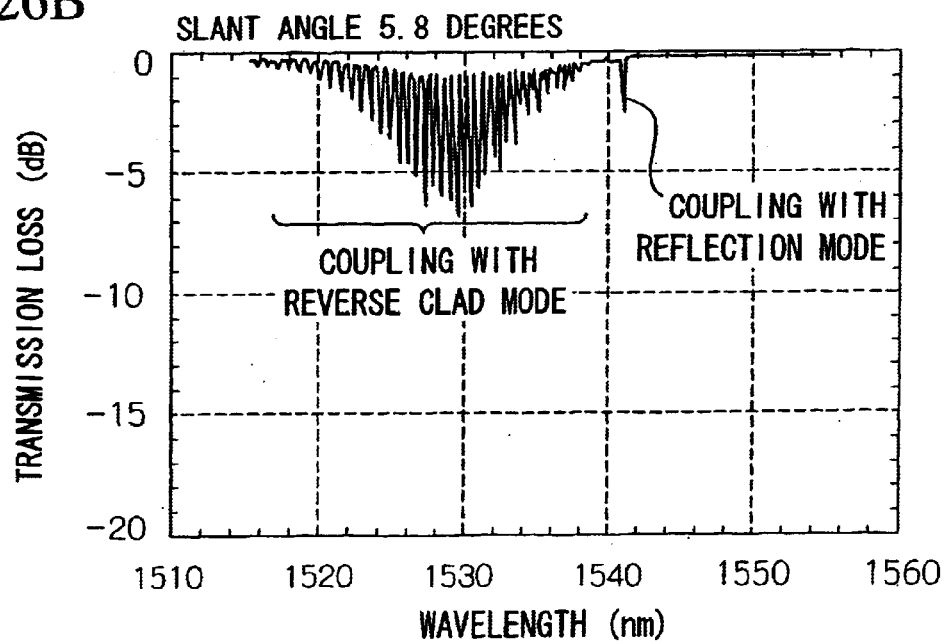
Figure 27:
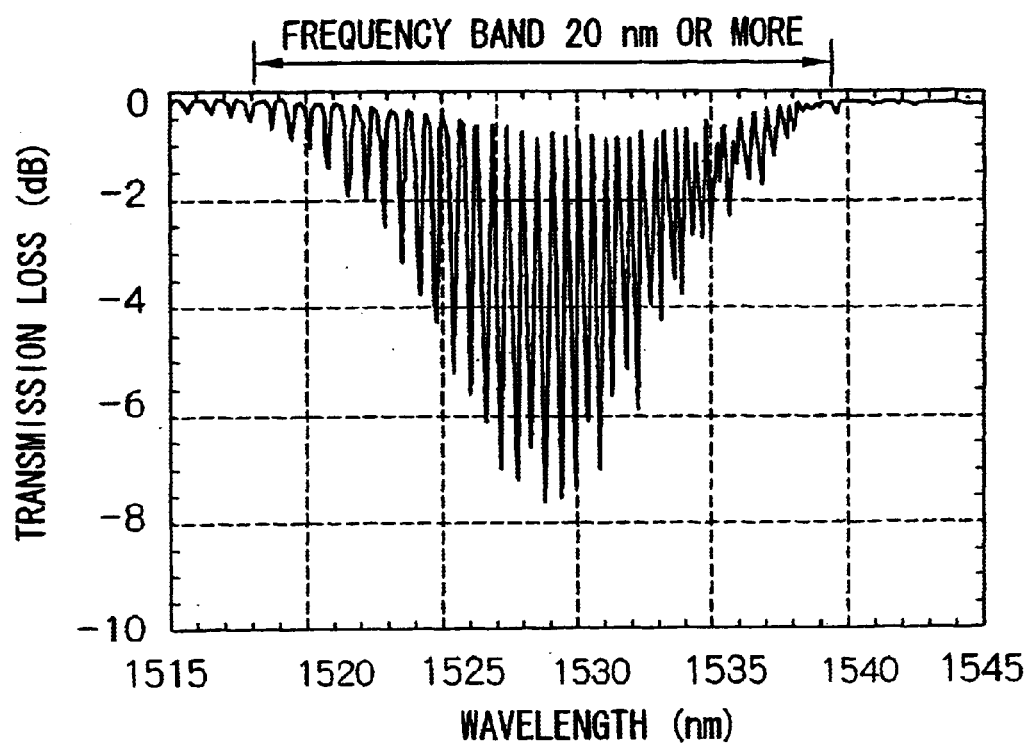
FIG. 27 is a graph showing an example of a wavelength spectrum of a conventional slant SPG.

Moreover, in all of the calculation conditions the amount of change in the refractive index of the high refractive index portion 3 of the grating portion 4 shown in FIG. 24 is 0.001, while the grating length (i.e., the length of the grating portion 4) is 1 mm.

Firstly, combinations of the three values of ② the diameter a of the core, ① the standardized frequency V, and ③ the relative photosensitivity ratio P of the core to the photosensitive layer of the clad are set. For each of these set conditions, the slant angle θ is gradually increased from zero degrees, and the first angle (i.e., the reflection suppression angle) at which the transmission loss caused by coupling with the reflection mode (reverse LP01 mode) reaches the minimum value (normally, approximately 0 to 0.01 dB) is taken as the slant angle θ. The slant angle θ differs due to other conditions as well, however, essentially, it is between 1.5 and 8 degrees, and preferably between 1.6 and 6 degrees.

Next, effective refractive index and coupling constant calculations are performed for a coupling of a waveguide mode with the LP0X mode group and LP1X mode group for a slant SPG in which the combinations of the three values of ① the diameter a of the core, ② the standardized frequency V, and ③ the relative photosensitivity ratio P of the core to the photosensitive layer of the clad and the slant angle are fixed as the reflection suppression angle.

As described above, the couplings with the LP0X mode groups and the LP1X mode groups are couplings with clad mode groups that form a main band and side bands.

Figure 9:
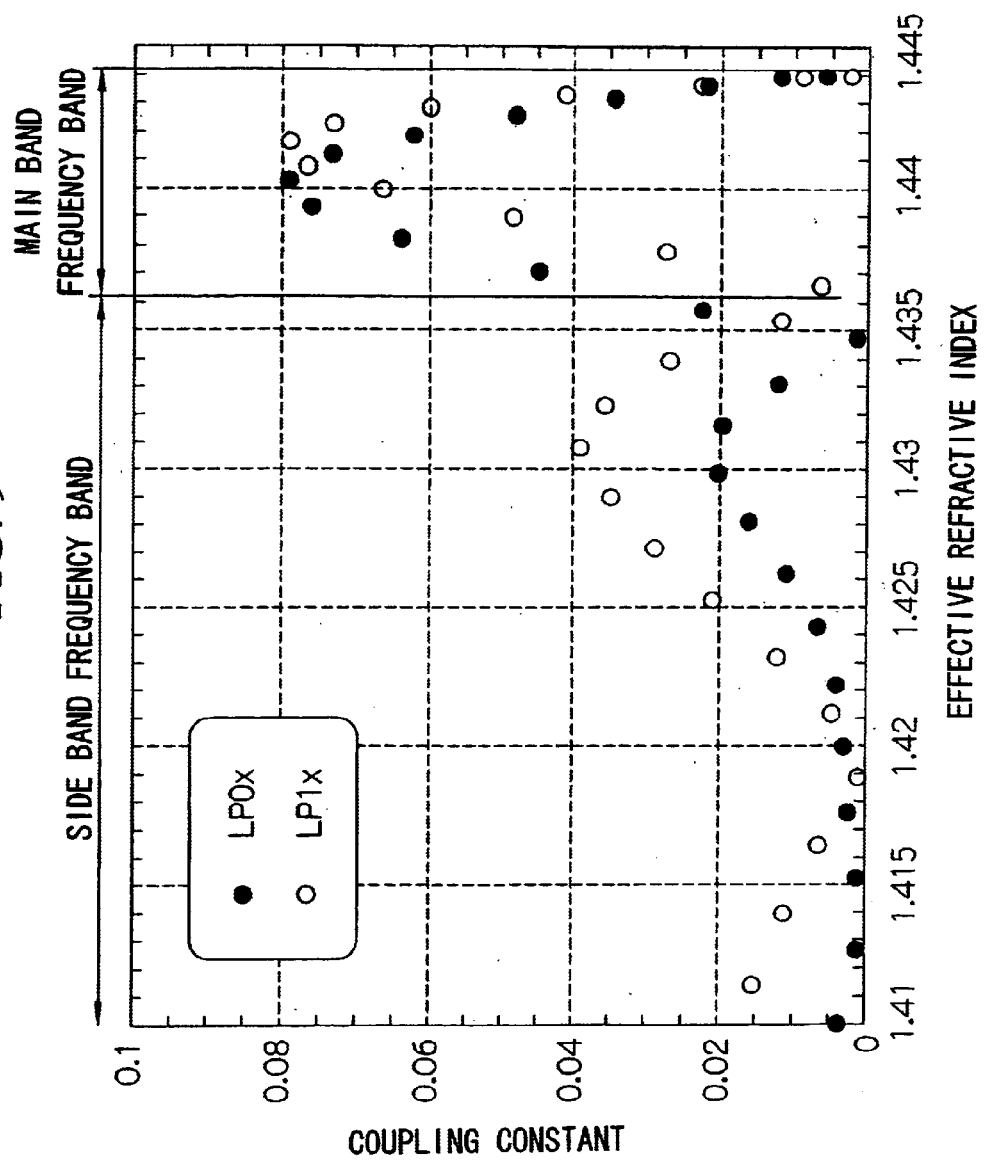
FIG. 9 is a graph showing a result of a calculation of a relationship between an effective refractive index and a coupling constant in the slant SPG of the second embodiment.
Figure 11A:
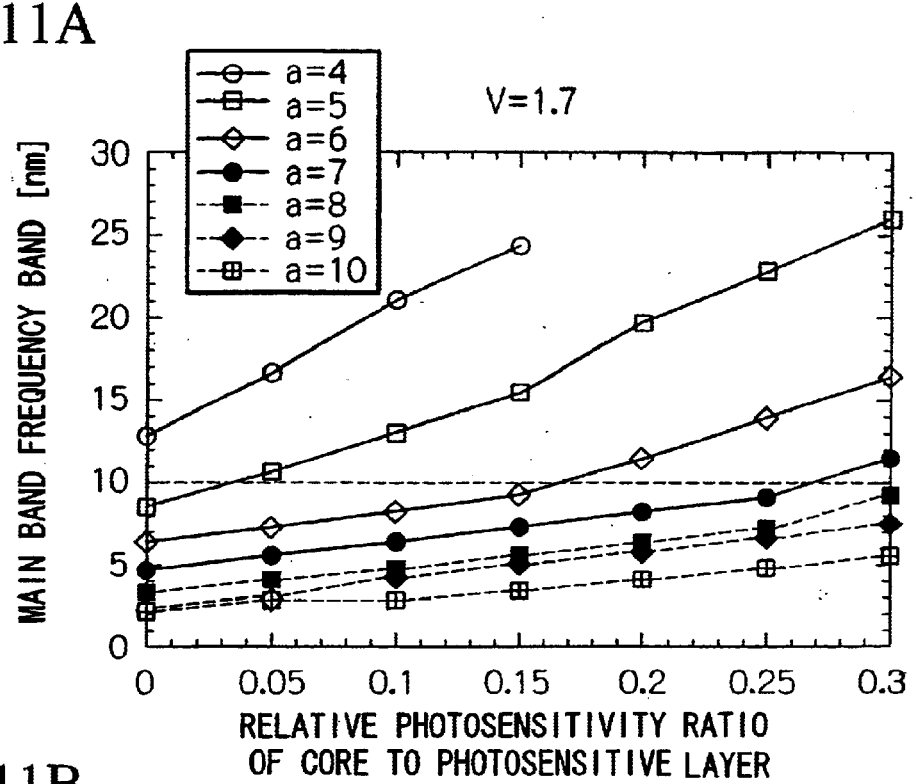
FIGS. 11A and 11B are graphs showing an example of a relationship between a relative photosensitivity ratio of a core and a main band frequency band in the second embodiment.
Figure 11B:
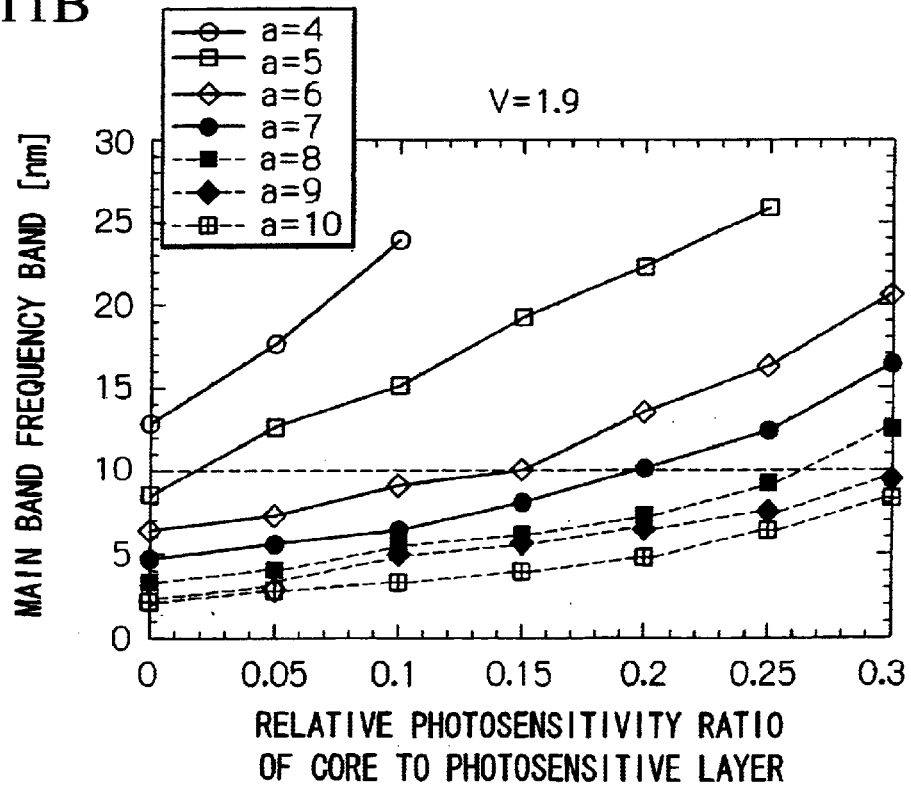
Figure 12A:
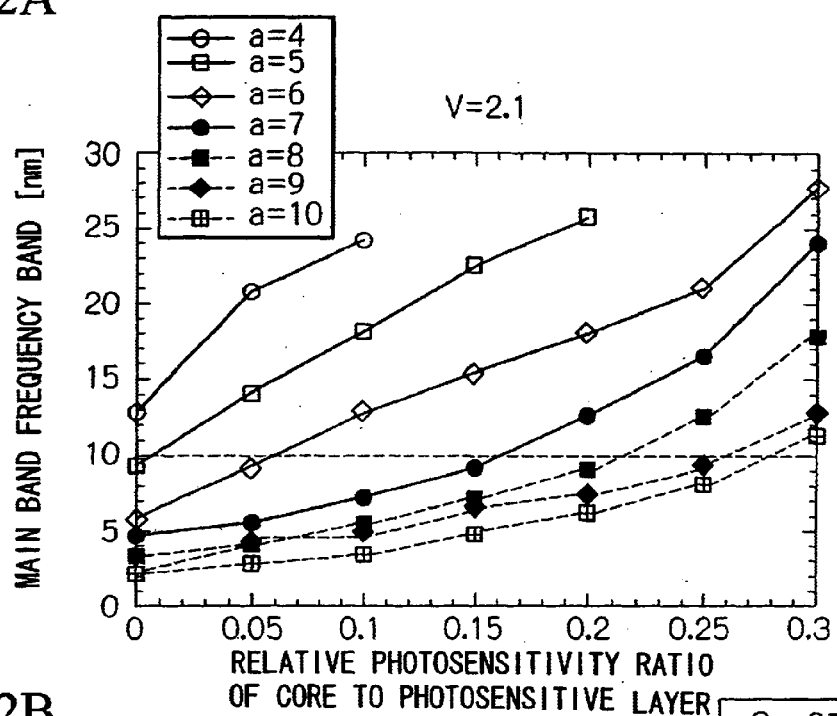
FIGS. 12A and 12B are graphs showing an example of a relationship between a relative photosensitivity ratio of a core and a main band frequency band in the second embodiment.
Figure 12B:
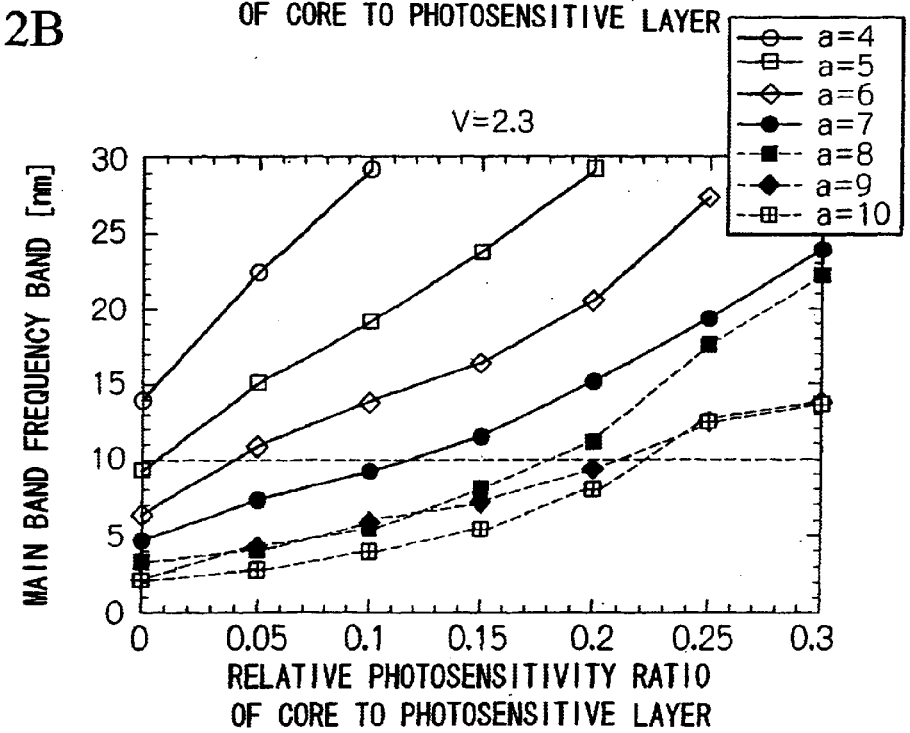
Figure 13A:
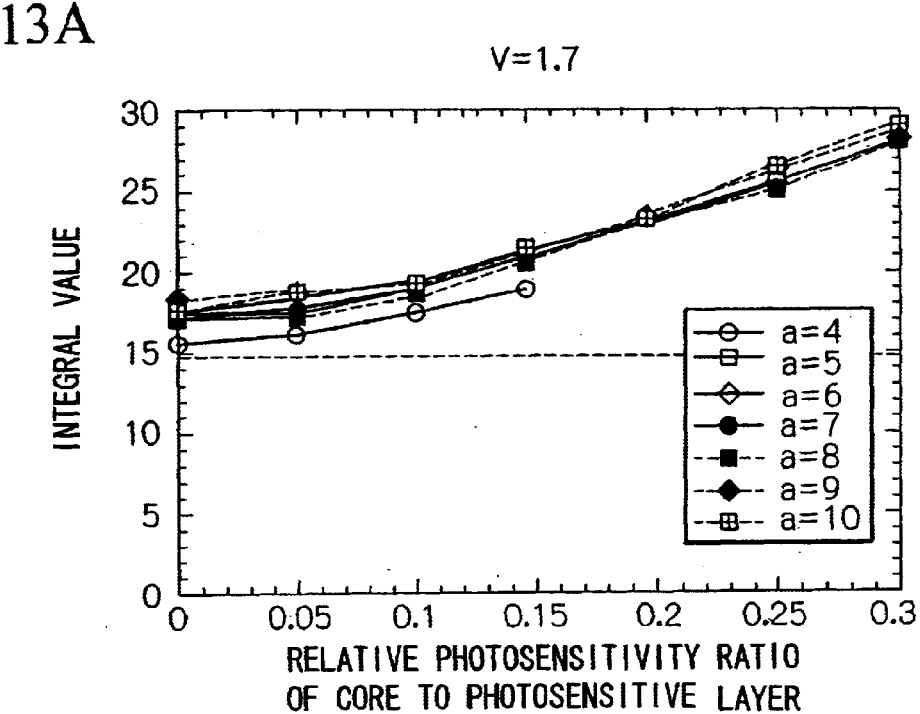
FIGS. 13A and 13B are graphs showing an example of a relationship between a relative photosensitivity ratio of a core and a main band frequency band in the second embodiment.
Figure 13B:
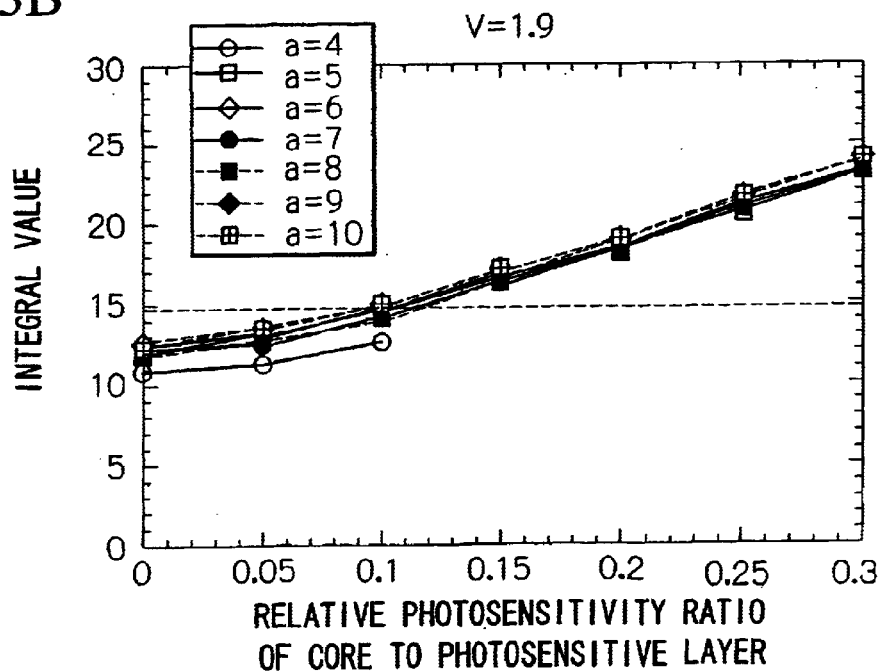
Figure 14A:
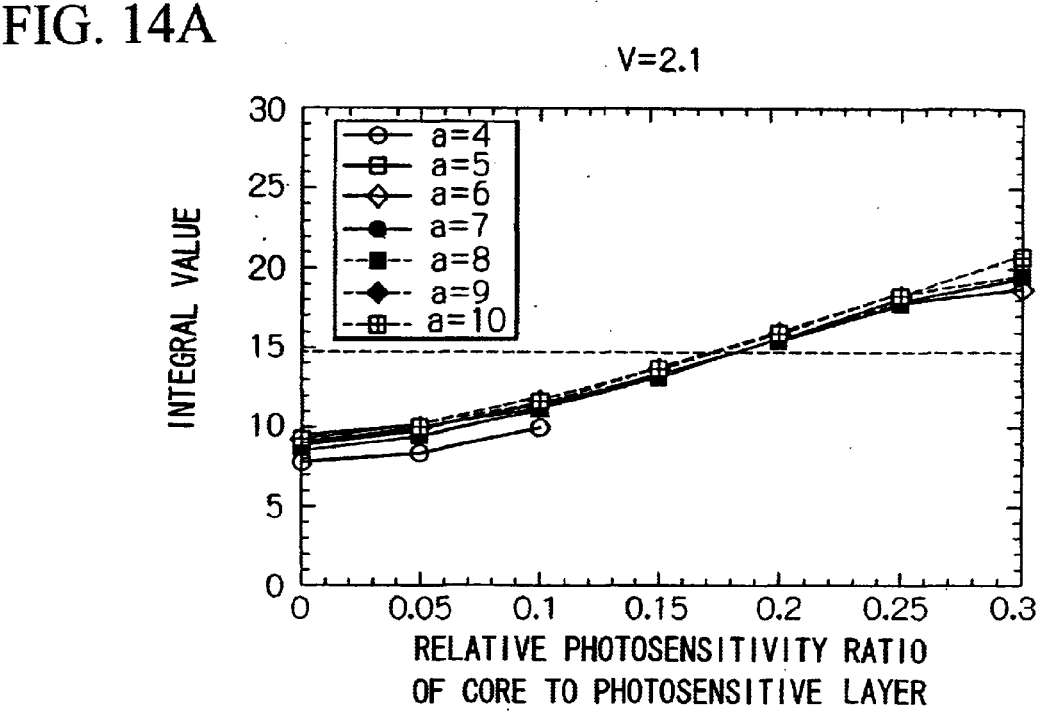
FIGS. 14A and 14B are graphs showing an example of a relationship between a relative photosensitivity ratio of a core and integral values in the second embodiment.
Figure 14B:
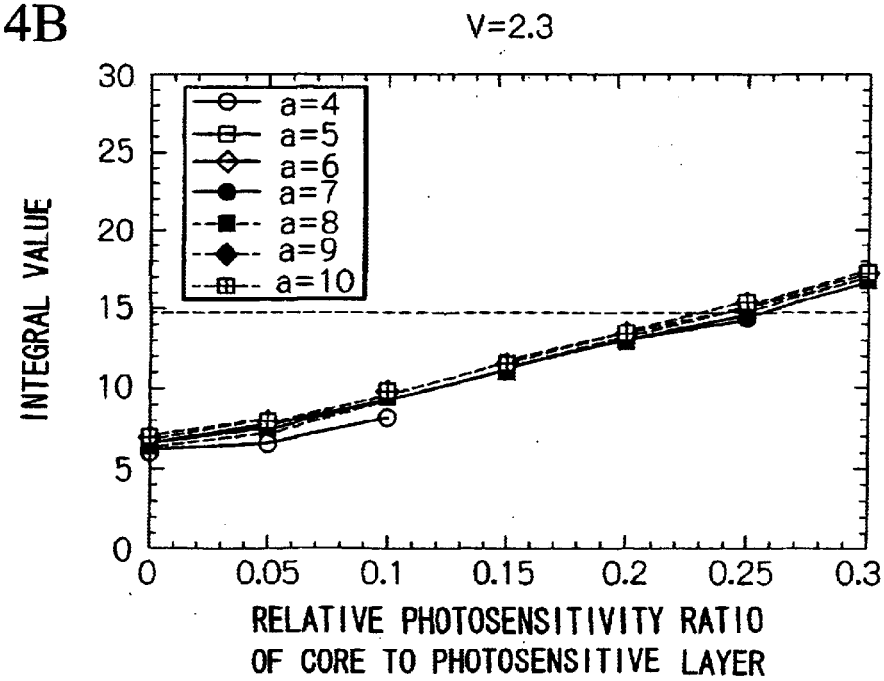

FIG. 9 is a graph showing an example of a result of this calculation. The symbol ● represents the LP0X mode (LP01, LP02 . . . ), and the symbol ○ represents the LP0X mode (LP01, LP02 . . . ) (wherein X is an integer).

Note that the main band loss frequency band (the main band frequency band) is taken between the LP11 mode that appears on the longest wavelength side of the main band and the coupling wavelength that corresponds to the first LP1X mode where the loss is at the minimum. In addition, the frequency band on the shorter wave side of this where a coupling occurs is taken as the side band loss frequency band (side band frequency band).

Furthermore, this effective refractive index and coupling coefficient are then converted into the coupled wavelength and transmission loss obtained when a transmission loss is created for a slant SPG under conditions of a center grating period of 530 nm and a chirping ratio of 0.35 nm/mm, and that has a form in which the grating period is gradually enlarged, by determining the transmission loss in each mode using transmission queues so as to calculate the sum of the transmission losses thereof. Thereafter, a graph showing the relationship between wavelength and transmission loss, such as that shown in FIG. 10, is obtained. The main band frequency band is determined from this graph.

This calculation was performed for each slant SPG in which the combination of the three values of ① the diameter a of the core, ② the standardized frequency V, and ③ the relative photosensitivity ratio P of the core to the photosensitive layer of the clad is changed, and the respective main band frequency bands (nm) thereof were determined.

FIGS. 11A, 11B, 12A, and 12B are graphs showing the relationship between the relative photosensitivity ratio P and the main band frequency band for the respective standardized frequencies V.

In each graph are shown the respective graph lines for each of the core diameters a.

From these graphs it can be seen that in a chirped pitch slant SPG the main band frequency band becomes larger as the relative photosensitivity ratio of the core becomes larger, and also that this trend becomes more remarkably the smaller the radius of the core.

The larger the relative photosensitivity ratio of the core, the larger the amount of change in the refractive index of the core when the grating section is being formed. Therefore, coupling with a reflection mode occurs more easily. Thus, in order to prevent such coupling with a reflection mode it becomes necessary to increase the size of the slant angle θ.

In contrast, because there is a tendency for the main band frequency band to become larger as the slant angle θ becomes larger, the result is that the main band frequency band becomes larger.

Moreover, from these graphs it can be confirmed that the main band frequency band also depends on the diameter of the core and the standardized frequency. Namely, there is a tendency for the main band to become narrower as the diameter of the core increases, and to become narrower as the standardized frequency becomes smaller. Namely, there is a tendency for light to spread out over the cross section of the optical fiber as the diameter of the core increases. Moreover, if the standardized frequency becomes smaller while the diameter of the core remains the same, the core-clad comparative refractive index difference becomes smaller and, in the same way, there is a tendency for the light to spread out.

In a slant SPG there is also a dependency of the periodic structure on the direction of the fiber cross section, however, the phase matching conditions in the direction of the cross section are also constrained by the spreading out of the light. As a result, coupling with the reflection mode is reduced even when the slant angle θ is small, and it is possible to narrow the main band frequency band.

Accordingly, it is clear from the graphs shown in FIGS. 11A to 12B that in order to narrow the main band frequency band, it is sufficient if the relative photosensitivity ratio of the core is made smaller, the diameter of the core is made larger, and the standardized frequency is made smaller.

Here, the main band frequency band of a slant SPG that is actually practicable and that the objects of the present invention to be achieved is taken as 10 nm or less. A relationship between ① the diameter a of the core, ② the standardized frequency V, and ③ the relative photosensitivity ratio P of the core to the photosensitive layer of the clad that satisfies the condition of a main band frequency band of 10 nm or less is represented by Formula (2).

If the diameter of the core, the standardized frequency, and the relative photosensitivity ratio of the core are set so as to satisfy this relationship, then if the grating period is constant, a slant SPG can be obtained whose main band frequency band has narrow transmission characteristics regardless of whether or not a chirped pitch is employed.

Note that, in Formula (2), if the numerical range of the relative photosensitivity ratio P is 0 or less, or is an imaginary number, then a structure is employed in which the relative photosensitivity ratio P is set at zero and a photosensitive dopant is not doped to the core.

By satisfying Formula (2) the effect is obtained that the degree of freedom in design when creating an optical filter is increased. In addition, when applied to a gain equalizer that equalizes gain in an erbium doped optical fiber amplifier, the effect is obtained that the gain equalization residue can be reduced.

2-2. Conditions for Enlarging Transmission Loss (Main Band Area):

In accordance with the type of application there may be a need for an optical filter to not only be able to narrow the loss band, but to more preferably be able to "enlarge transmission loss (main band area)". This is because in order to efficiently filter light of a specific wavelength it is necessary to increase the power of light from the waveguide mode coupling with the clad mode.

The power of this coupling light increases if the amount of change in the refractive index of the grating section is increased. However, there is a limit to the increase in the amount of change in the refractive index. For example, the amount of change in the refractive index is $1.0 \times 10^{-2}$ or less, and essentially is between $5.0 \times 10^{-4}$ and $5.0 \times 10^{-3}$.

Therefore, characteristics are sought whereby the power of light coupling with the clad mode is increased sufficiently even by a small amount of change in the refractive index.

Note that here a small amount of change in the refractive index is, for example, $3 \times 10^{-3}$ or less, and preferably is between $5.0 \times 10^{-4}$ and $2.0 \times 10^{-3}$.

Therefore, investigations were carried out for conditions in which the integral value of the loss peak of the main band shown in FIG. 10 increased. The integral value is the surface area of the diagonal line portion of the graph shown in FIG. 10.

Namely, as was explained in 2-1 above, graphs were sought that show a wavelength-transmission loss relationship such as that shown in FIG. 10, and the integral values of the loss peaks of the main bands of these graphs were then determined.

This calculation was performed for each slant SPG that was obtained by taking the slant angle as the reflection suppression angle and then changing the combination of the three values of ① the diameter a of the core, ② the standardized frequency V, and ③ the relative photosensitivity ratio P of the core to the photosensitive layer of the clad. The integral values of the area of the loss peak of the main band were then each determined by numerical calculation. The units for the integral values are dB·nm. Note that the integral values used here are not absolute values but are relative values used for comparing the size of the transmission loss area when the parameters are changed.

In this calculation example, the integral value was set as 12.08, when:
 the standardized frequency V=1.9,
 the core diameter a=8 μm, and
 the core relative photosensitivity ratio P=0 and was set as a reference.

FIGS. 13A, 13B, 14A, and 14B are graphs showing the relationship between the relative photosensitivity ratio P and the integral value of the main band transmission loss area for the respective standardized frequencies V. In each graph are shown the respective graph lines for each value of the core diameters a.

From these graphs it can be seen that there is a tendency for the integral value to be bigger the larger the relative photosensitivity ratio. This is because the coupling efficiency with the clad mode increases as the relative photosensitivity ratio of the core increases.

The integral value also depends on the standardized frequency, and increases as the standardized frequency is reduced. This is because the smaller the standardized frequency, the easier it is for more waveguide mode to leak into the photosensitive layer of the clad having the larger photosensitive ratio.

Note that if the standardized frequency is the same, it is also possible to confirm that there is almost no effect from the diameter of the core on the integral value.

Accordingly, it is clear that, in order to increase the integral value, it is sufficient to increase the relative photosensitivity ratio of the core and to decrease the standardized frequency.

Here, in consideration of achieving the aim of obtaining optical characteristics that are actually practicable and in which there is a large transmission loss, the integral value of the slant SPG was set as 15 or more.

By satisfying these conditions the following effects are achieved. Namely, because it is possible to achieve a large loss with the same change in the refractive index, when making optical filters with the same loss, these can be made with a short exposure time. Moreover, if a change in the refractive index can be brought about while irradiating the light for the same length of time, then an optical filter can be produced having greater transmission loss. Moreover, if the present invention is applied, for example, to a gain equalizer that equalizes the gain of an erbium doped optical fiber amplifier, then a mass production effect is obtained through the reduction in the exposure time. Note that because a larger integral value is more preferable there is no particular limit on the maximum value.

In order to satisfy these conditions, it is preferable that the relative photosensitivity ratio of the core satisfies Formula (3).

Note that, in Formula (3), if the numerical range of the relative photosensitivity ratio P is 0 or less, or is an imaginary number, then a structure is employed in which the relative photosensitivity ratio is set at zero and a photosensitive dopant is not doped to the core.

Moreover, it is preferable if both Formula (2) and Formula (3) are satisfied, as this enables the main band frequency band to be narrowed and the transmission loss to be increased.

Figure 15A:
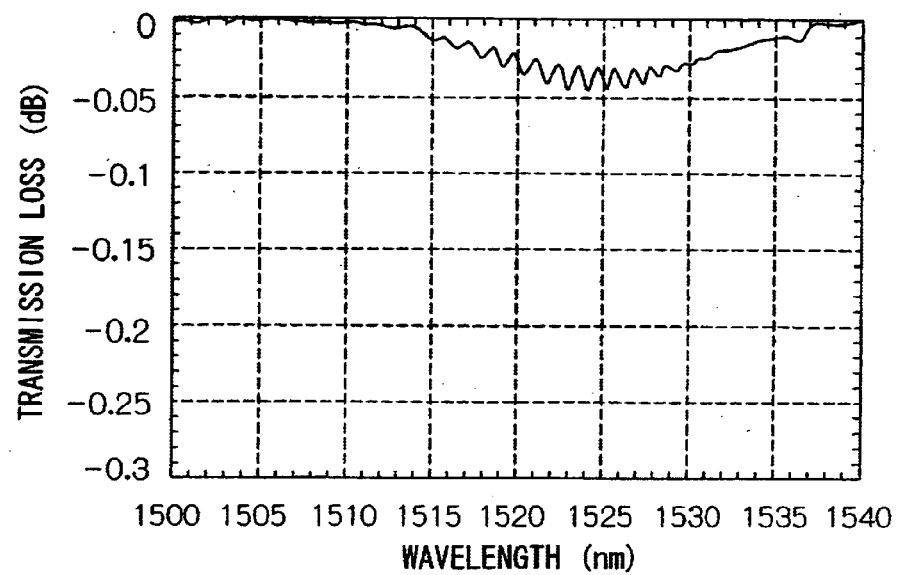
FIGS. 15A and 15B are graphs showing an example of a relationship between core wavelength and transmission loss in the second embodiment.

FIG. 15A shows the wavelength spectrum of a slant SPG produced under the following conditions which does not satisfy both Formula (2) and Formula (3).

the relative photosensitivity ratio P=0.2 the standardized frequency V=2.3 the core diameter a=5 $\mu$m.

Figure 15B:
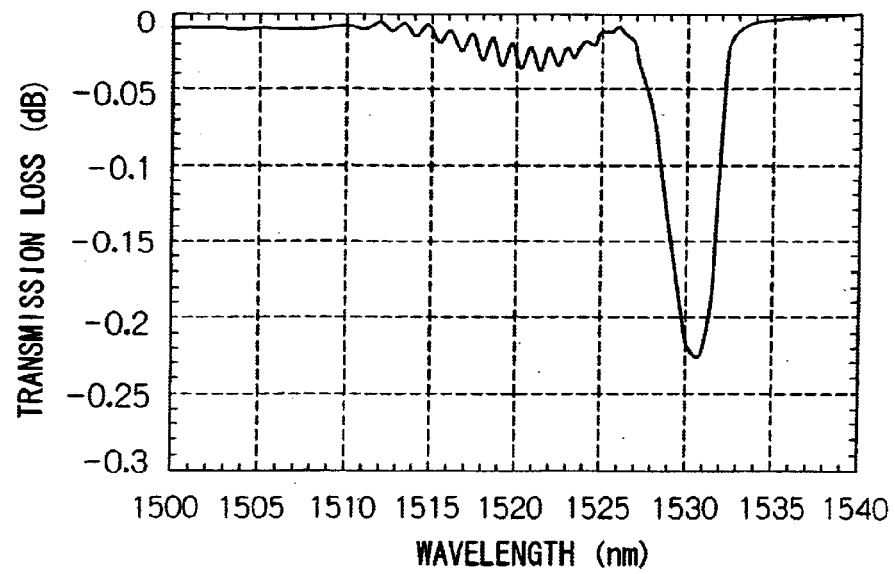

FIG. 15B shows the wavelength spectrum of a slant SPG produced under the following conditions which does satisfy both Formula (2) and Formula (3).

the relative photosensitivity ratio P=0.1 the standardized frequency V=1.7 the core diameter a=5 $\mu$m.

In the wavelength spectrum shown in FIG. 15A, there is no difference between the main band and side band, and the entire loss peak forms a substantially single peak over a wide frequency band. The frequency band of this peak is 29 nm, while the integral value of the main band is approximately 13, which is small.

In contrast to this, in the wavelength spectrum shown in FIG. 15B, the main band is sufficiently large relative to the side band. In addition, the main band frequency band is 6.5, which is sufficiently narrow, while the integral value of the loss peak of the main band is 19, which is sufficiently large.

2-3. Conditions for Suppressing Ghost Mode Peaks:

In accordance with the type of application it may be more preferable if there is a need for "suppressing ghost mode peaks".

Figure 16:
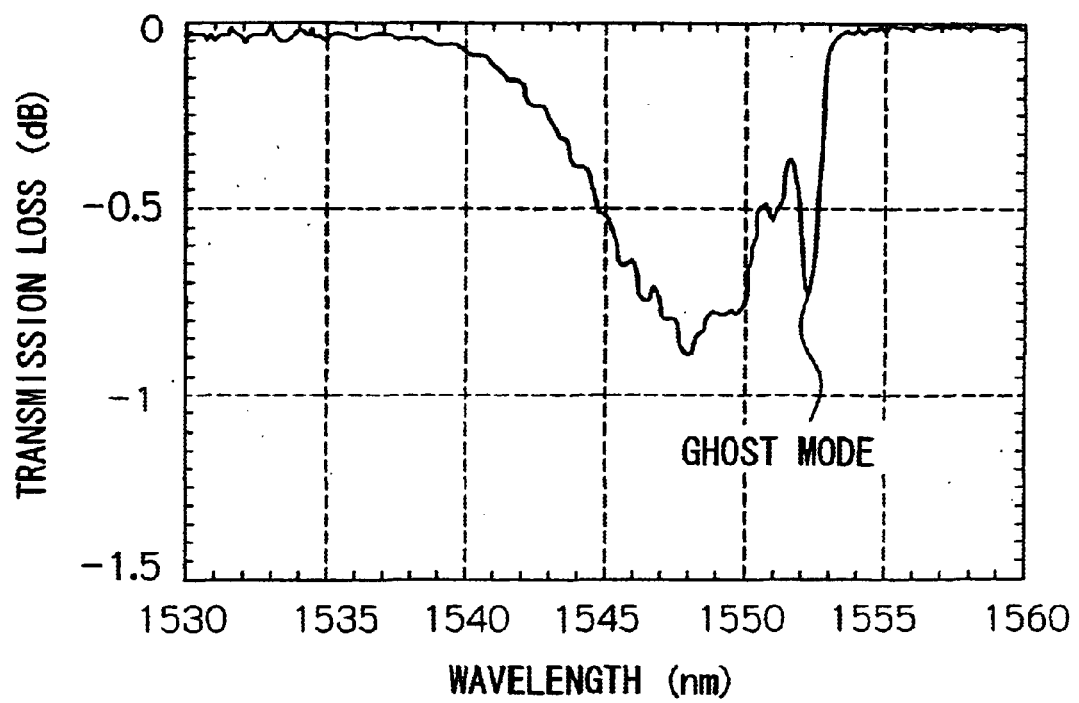
FIG. 16 is a graph showing an example of a wavelength spectrum of a slant SPG in which ghost mode peaks are present.
Figure 17A:
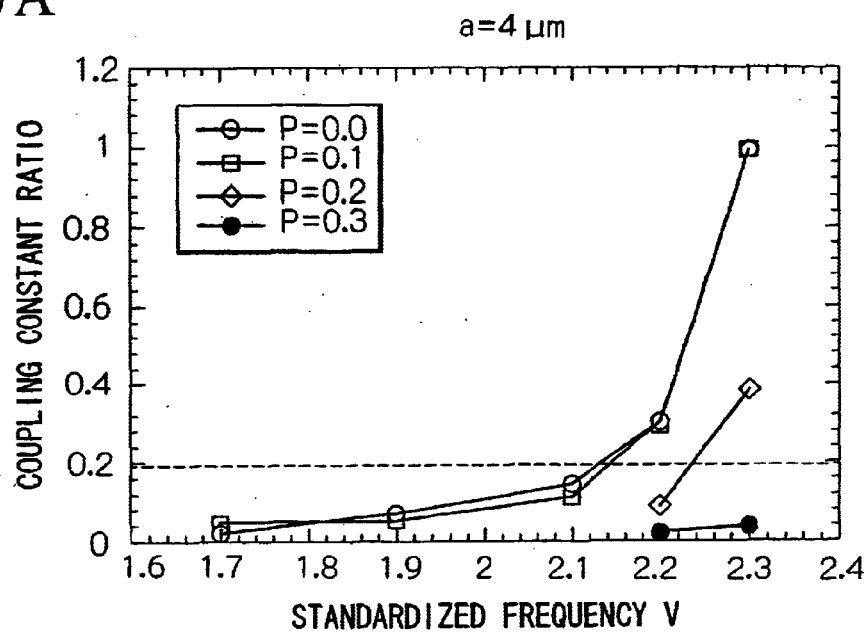
FIGS. 17A and 17B are graphs showing an example of a relationship between normalized frequencies and a coupling constant ratio in the second embodiment.
Figure 17B:
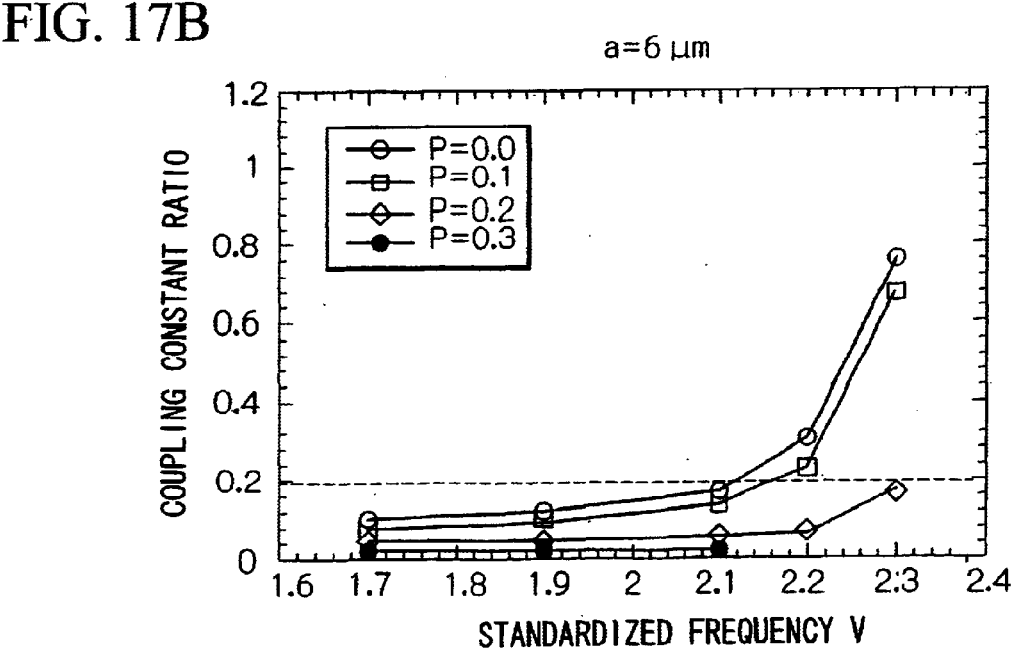
Figure 18A:
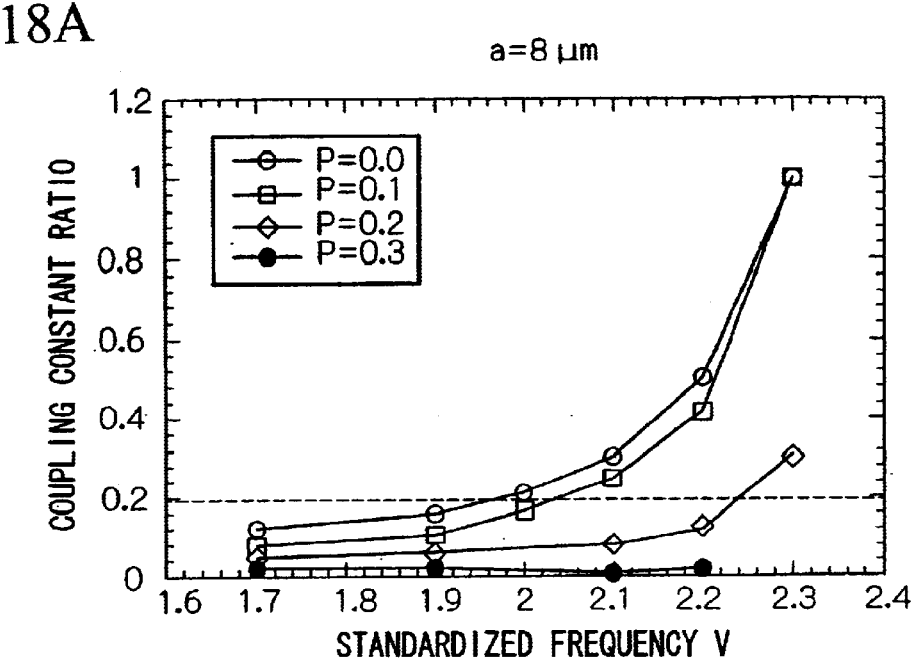
FIGS. 18A and 18B are graphs showing an example of a relationship between normalized frequencies and a coupling constant ratio in the second embodiment.
Figure 18B:
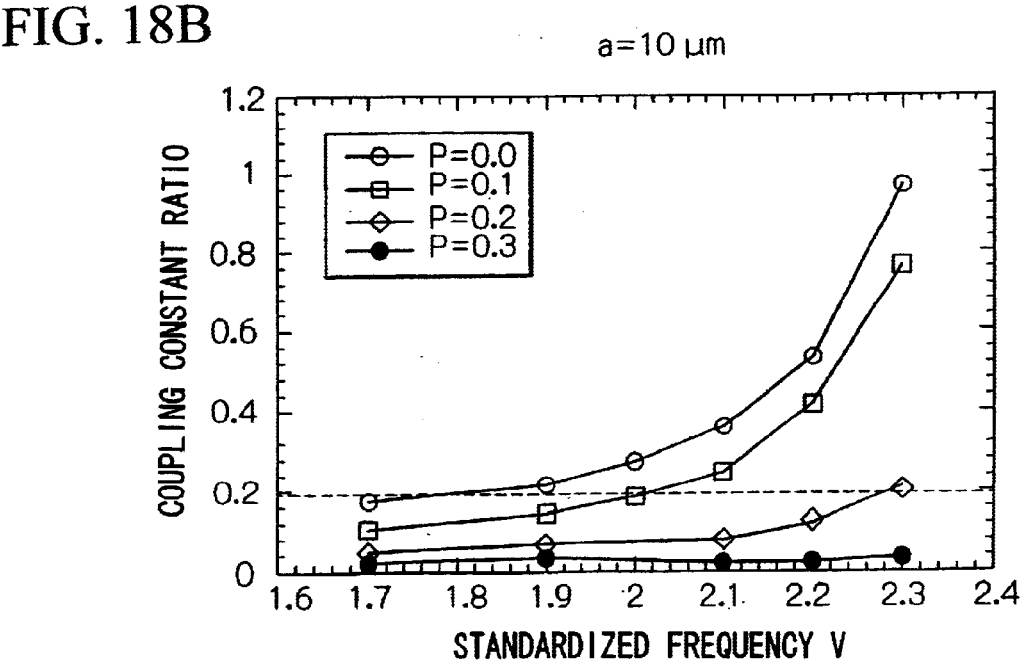

FIG. 16 shows an example of a wavelength spectrum of transmitted light in which a ghost mode peaks is present. A ghost mode is a clad mode, from among the clad modes that couple with the waveguide mode, that couples to a particularly large extent on the long wave side with a waveguide mode.

As is shown in FIG. 16, if this ghost mode peak is present then it is not possible to obtain filter characteristics that have a smooth long wavelength side.

A ghost mode peak is generated when the ratio of waveguide mode couplings with the LP11 mode, which is a lower order clad mode, is too great relative to the couplings of the waveguide mode with other modes.

In the same way as the examples shown in 2-1 and 2-2 above, FIGS. 17A, 17B, 18A, and 18B are diagrams in which, under the design conditions shown in FIG. 1, in a chirped pitch slant SPG in which a reflection suppression angle has been set, the ratios (i.e., the coupling constant ratios) of the coupling constants with the LP11 mode relative to the largest coupling constants from among the coupling constants with the other modes are shown in graphs in their relationships with the standardized frequencies.

In each of these graphs the core diameter a is constant.

Moreover, each graph shows the respective core relative photosensitivity ratios P.

Note that the smaller the coupling constant the more difficult it is for ghost mode peaks to be generated.

From these graphs it can be seen that the coupling constant ratio is also greatly dependent on the standardized frequency, and that the larger the standardized frequency the smaller the coupling constant ratio and the easier it is for ghost mode peaks to be generated. This is because the larger the standardized frequency the stronger the electric field distribution of the LP11 mode is in the vicinity of the core, and there is increased overlapping of the electric field distribution of the LP11 mode with the electric field distribution of the waveguide mode.

Figure 19A:
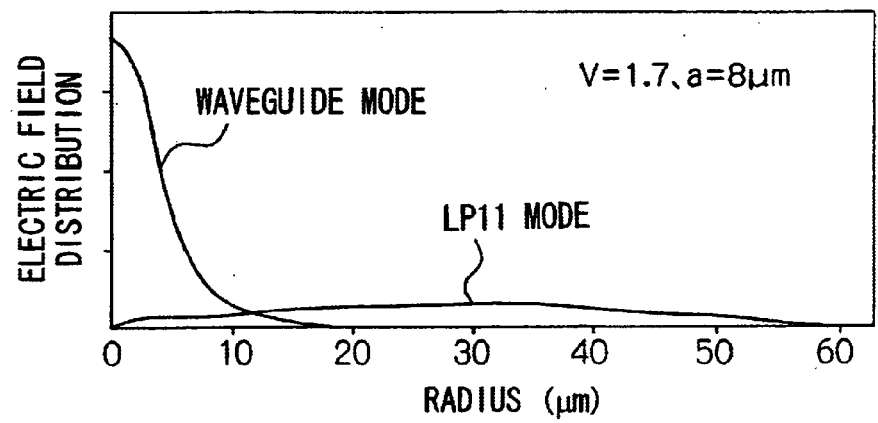
FIGS. 19A and 19B are graphs showing an electric field distribution of LP11 mode and waveguide mode.
Figure 19B:
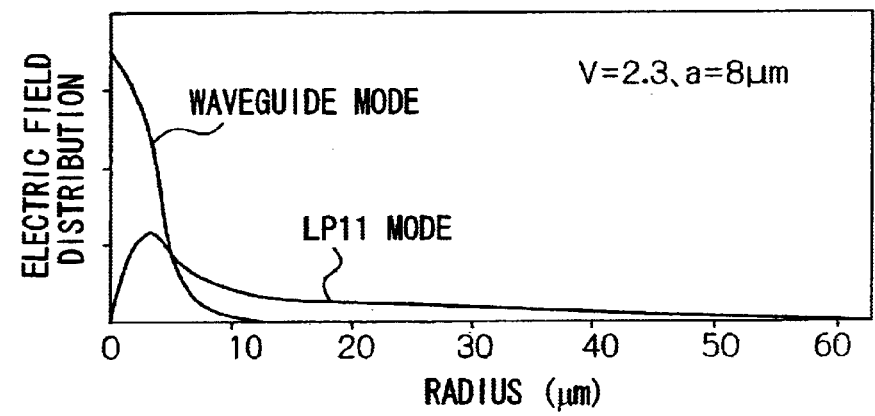

FIG. 19A is a graph showing the electric field distributions of the LP11 mode and waveguide mode when the core diameter a is 8 $\mu$m and the standardized frequency is 1.7. FIG. 19B is a graph showing the electric field distributions of the LP11 mode and waveguide mode when the core diameter a is 8 $\mu$m and the standardized frequency is 2.3.

Here, the coupling constant ratio is regulated to 0.2 or less as a range that does not allow the ghost mode peaks to become a problem.

By satisfying these conditions an optical filter whose long wavelength side also had smooth characteristics was obtained. Moreover, an optical filter with a narrower filter frequency band and whose long wavelength side also had smooth characteristics when applied to a gain equalizer that equalizes gain in an Er doped optical fiber amplifier was obtained.

In order to satisfy these conditions it is preferable that the relative photosensitivity ratio of the core satisfies Formula (4).

Note that, in Formula (4), if the numerical range of the relative photosensitivity ratio P is 0 or less, or is an imaginary number, then a structure is employed in which the relative photosensitivity ratio is set at zero and a photosensitive dopant is not doped to the core.

Figure 20A:
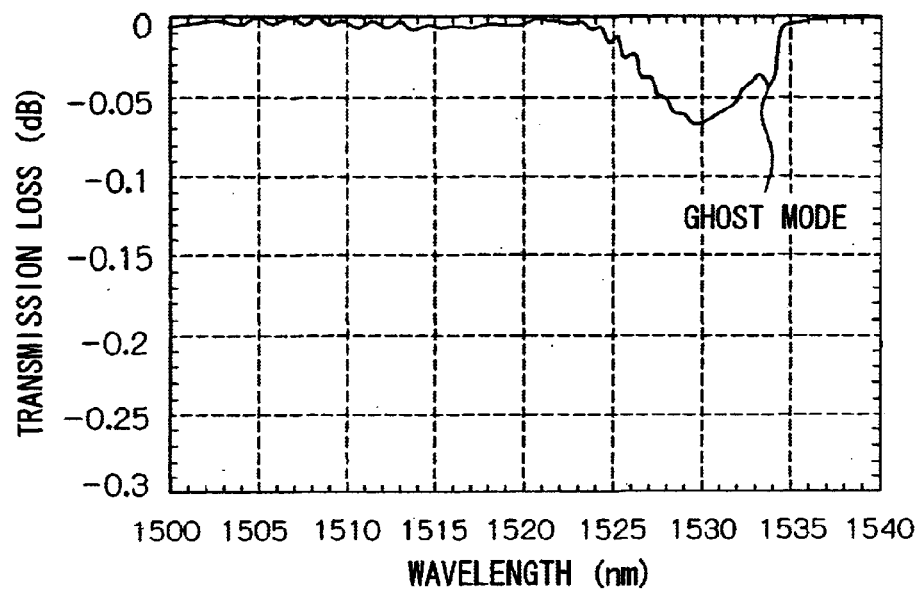
FIGS. 20A and 20B are graphs showing an example in which ghost mode peaks are present and an example in which ghost mode peaks are not present in the second embodiment.

FIG. 20A shows an example of the wavelength spectrum of a slant SPG produced under the following conditions which does not satisfy Formula (4).

the standardized frequency V=2.3 the core diameter a=7 μm.

the core relative photosensitivity ratio P=0.15

Figure 20B:
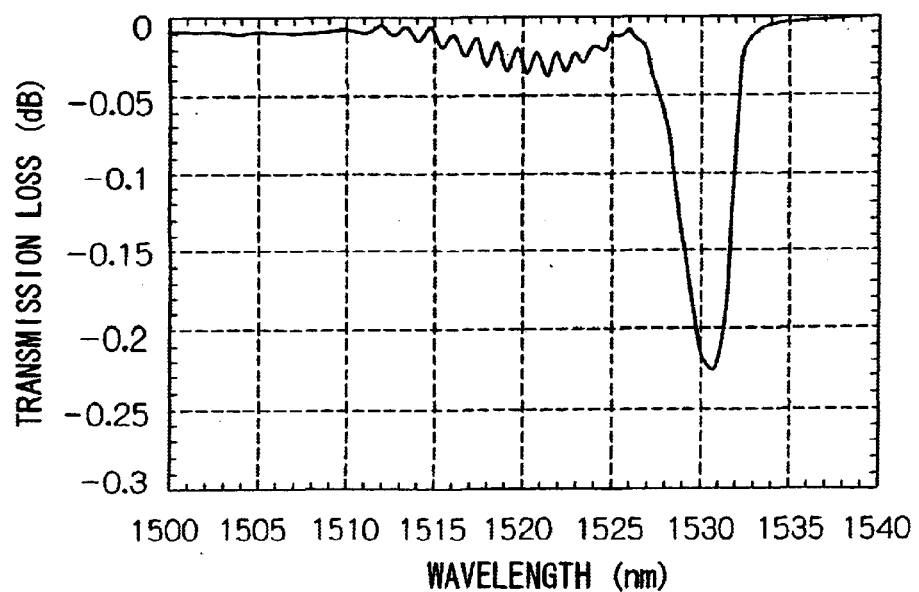
Figure 21A:
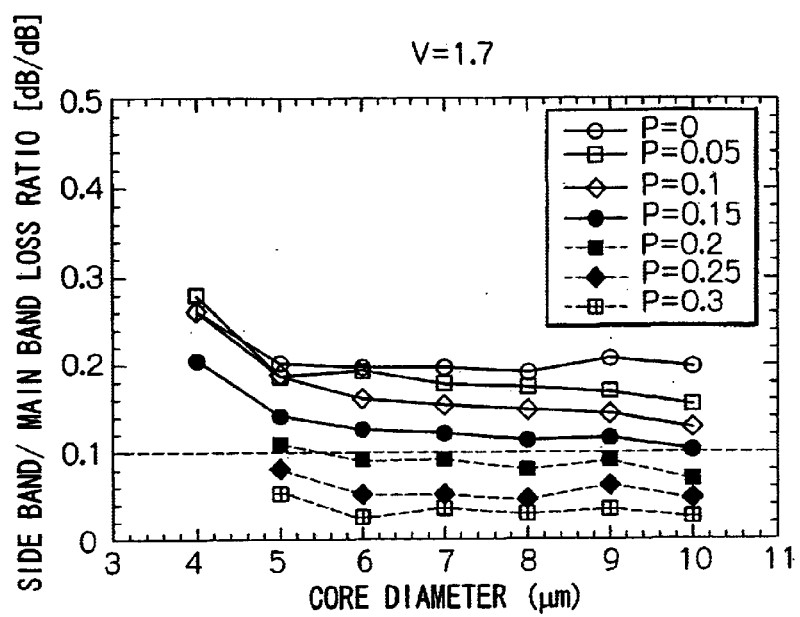
FIGS. 21A and 21B are graphs showing a core diameter—side band/main band loss ratio in the second embodiment.
Figure 21B:
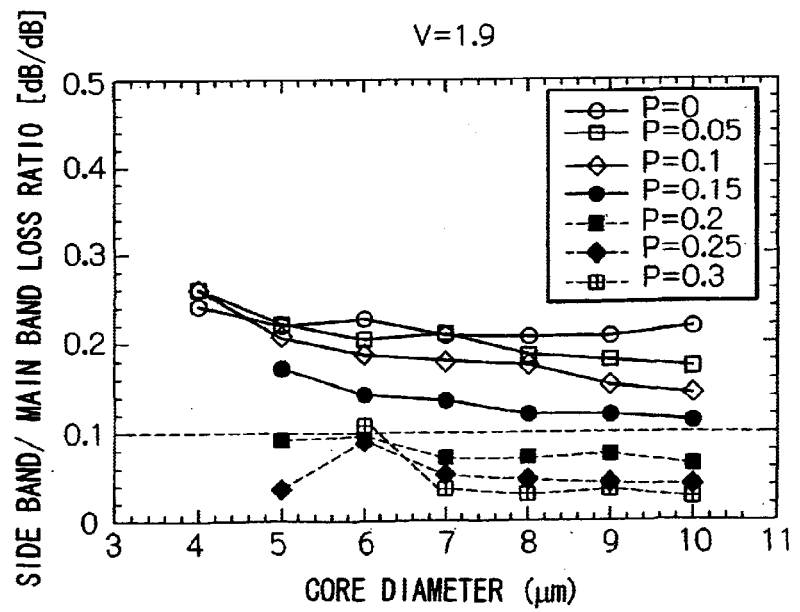
Figure 22A:
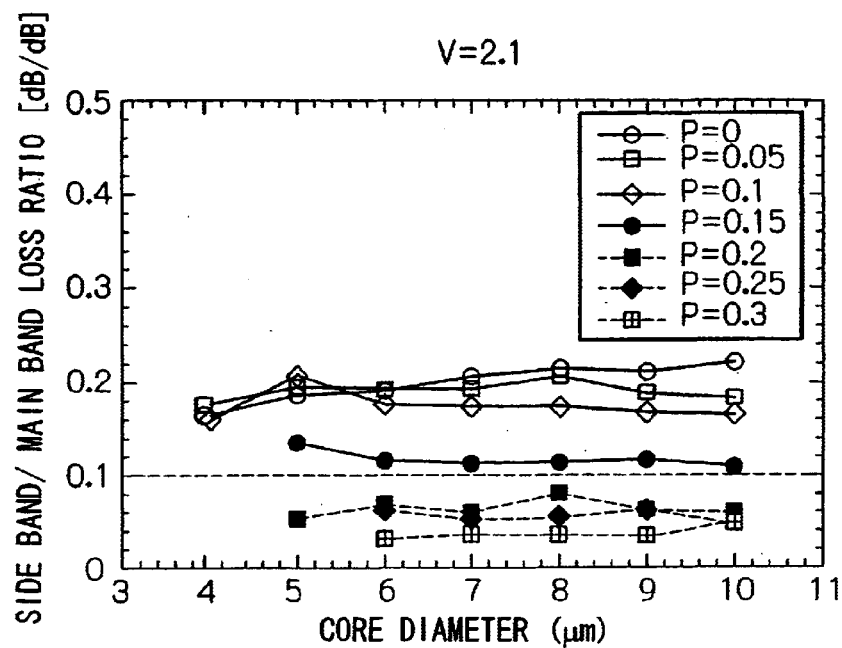
FIGS. 22A and 22B are graphs showing a core diameter—side band/main band loss ratio in the second embodiment.
Figure 22B:
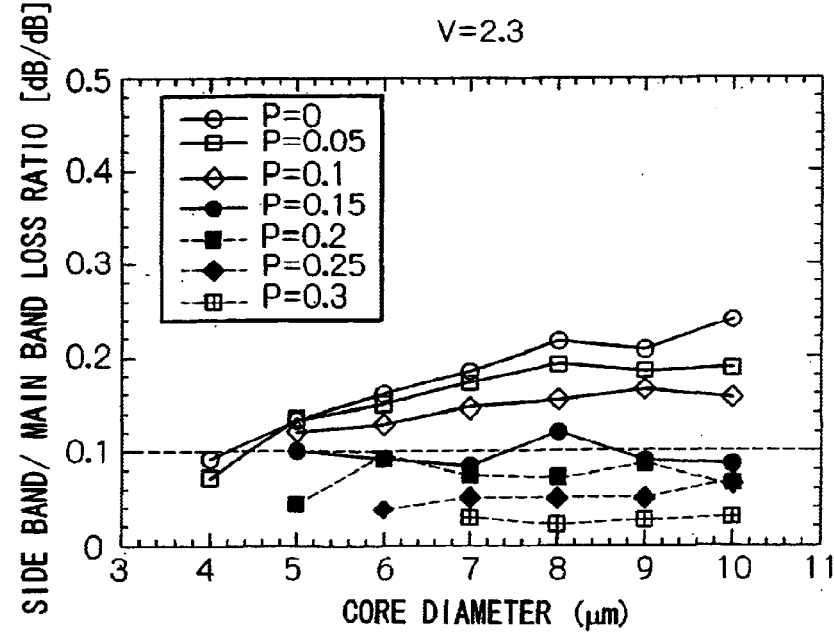

FIG. 20B shows an example of the wavelength spectrum of a slant SPG produced under the following conditions which does satisfy Formula (4).

the standardized frequency V=1.7 the core diameter a=7 μm.

the relative photosensitivity ratio P=0.1

If these graphs are compared it becomes clear that by satisfying Formula (4) ghost mode peaks are reduced.

Note that in the second embodiment, it is sufficient if one or more of the three conditions shown in the above 2-1 to 2-3 are satisfied, and preferable if two conditions are satisfied, and most preferable if all three conditions are satisfied.

2-4. Conditions for Suppressing Side Band Mode Loss Peaks:

As was described in the first embodiment above, the smaller the difference between transmission losses of the main band and the side band in the optical filter, the greater the degree of freedom in design. Therefore, a smaller difference is preferable.

Accordingly, "suppression of side band loss peaks" is sought.

Here, in the first embodiment, the conditions were for applying when the grating period was constant, however, in the present embodiment, the conditions can be applied regardless of whether the grating period is constant or whether there is a chirped pitch.

In the same way as for 2-1 to 2-3 above, FIGS. 21A, 21B, 22A, and 22B are graphs in which, in a chirped pitch slant SPG in which a reflection suppression angle has been set, relationships between the core diameter a and the transmission loss ratio represented as dB of the side band relative to the main band (i.e., the side band/main band loss ratio) are shown.

In each of these graphs the standardized frequency V is constant.

Moreover, each graph shows the respective core relative photosensitivity ratios P.

From these graphs it can be understood that the side band/main band loss ratio has substantially no dependency on the standardized frequency and the core diameter, and is only affected by the relative photosensitivity ratio of the core.

Furthermore, as was explained using the graph shown in FIG. 6 for the first embodiment, in order to reduce the side band/main band loss ratio it is preferable that there is a large core relative photosensitivity ratio.

In order to make the side band/main band loss ratio 0.1 or less, it is necessary to set the core relative photosensitivity ratio to 0.2 or more.

By providing characteristics such as these, the effect is obtained that the degree of freedom in design when creating wider frequency band filter characteristics is increased. In addition, when applied to a gain equalizer that equalizes gain in an Er doped optical fiber amplifier, the effect is obtained that the gain equalization residue can be reduced over a wide frequency band.

Figure 23A:
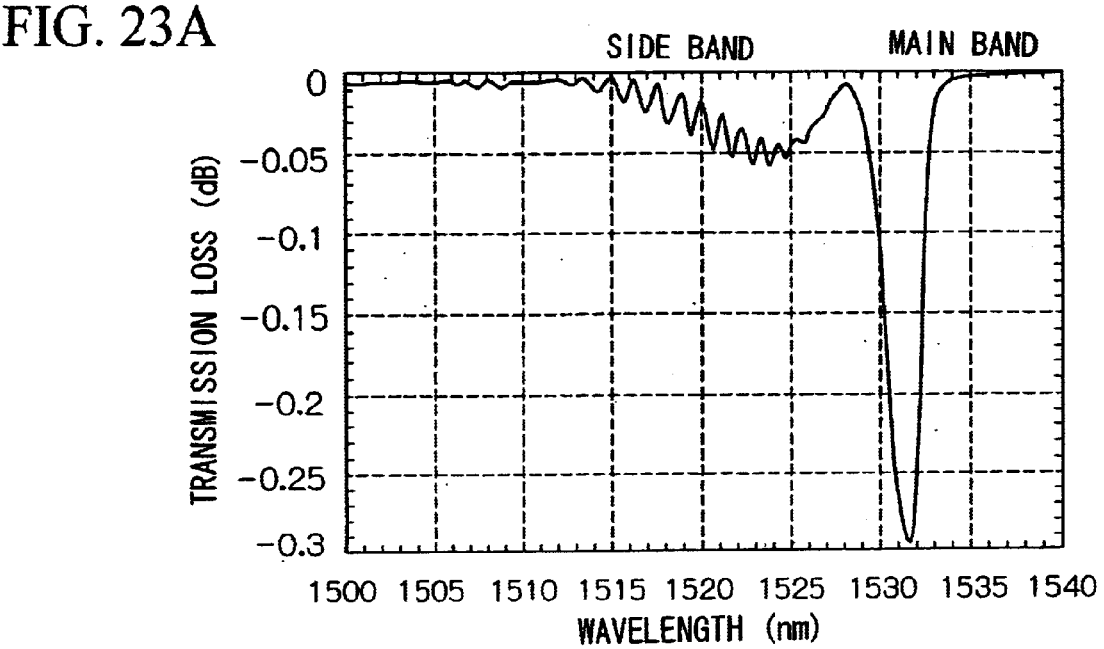
FIGS. 23A and 23B are graphs showing an example when a side band is large and an example when a side band is small in the second embodiment.

FIG. 23A shows an example of the wavelength spectrum of a slant SPG produced under the following conditions.

the standardized frequency V=1.7 the core diameter a=7 μm.

the core relative photosensitivity ratio P=0.00

Figure 23B:
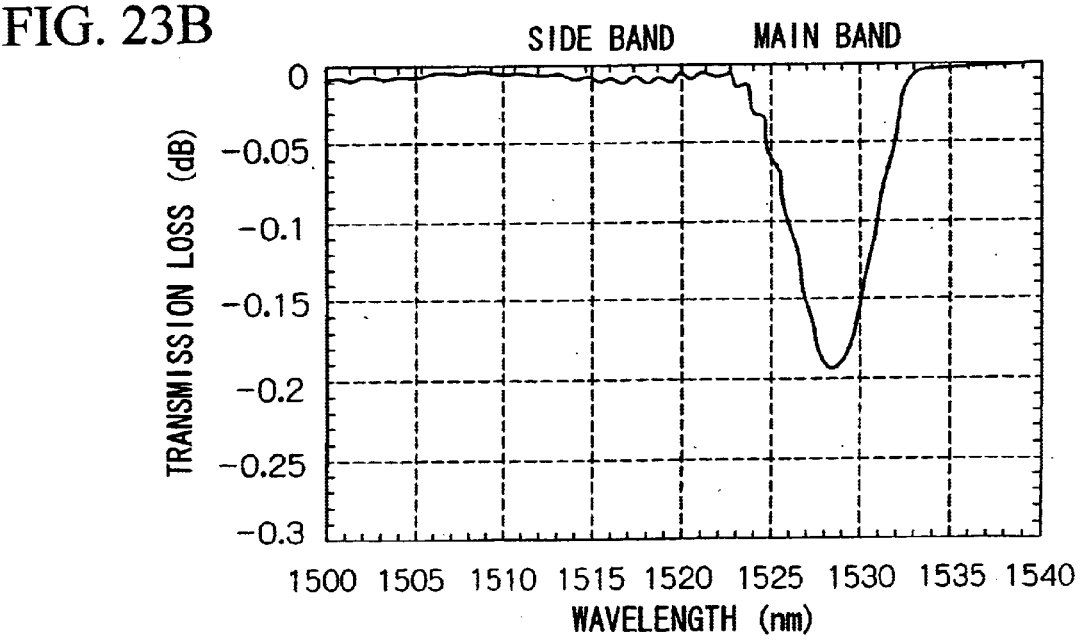

FIG. 23B shows an example of the wavelength spectrum of a slant SPG produced under the following conditions.

the standardized frequency V=1.7 the core diameter a=7 μm.

the relative photosensitivity ratio P=0.25

From these graphs it is clear that the side band can be suppressed by setting the core relative photosensitivity ratio to 0.2 or more. Note that these conditions should be satisfied after satisfying at least one from the above Formulas (2) to (4).

2-5. Concerning Other Optical Characteristics:

In the present embodiment, it is desirable that, in the 1,550 nm wavelength, bend loss of the optical fiber used in the slant SPG is not more than 1 dB/m at a winding diameter of 60 mm. It is more preferable that the bend loss be not more than 0.1 dB/m, and even more preferably 0.01 dB/m or less, at a winding diameter of 40 mm. The greater the bend loss the more the ease of handling and the like is reduced when housed in a module. Therefore, this is disadvantageous.

Further, it is preferable that the mode field diameter in the operating wavelength of the optical fiber (for example, 1500 to 1600 nm, and preferably 1550 nm) is 15 μm or less. If the mode field diameter exceeds 15 μm, the light confinement is weakened and the loss increases, which may render the apparatus unsuitable for practical application. The possibility of increased connection loss when the optical fiber is connected to another optical fiber also exists.

Note that the bend loss and mode field diameter are greatly affected by the core diameter a, and the bending loss increases if the core diameter a is increased. The mode field diameter also increases. Therefore, it is preferable that the core diameter a is, for example, 12 μm or less.

It is also preferable that the outer diameter of the photosensitive layer of the clad is 1.5 times or more the mode field diameter of the waveguide mode of the operating wavelength (1500 nm to 1600 nm in the present embodiment and preferably 1500 nm) of this slant SPG. There is no particular restriction as to the upper limit value; however, it is practically set at 8 times or less.

If the above value is less than 1.5 times, because the grating portion of the photosensitive layer is not formed in the area where the waveguide mode is propagated, there are times when sufficient transmission loss of the waveguide mode cannot be obtained.

Once these conditions have been satisfied it is desirable that the outer diameter of the photosensitive layer of the clad is 60 μm or less.

Because there is a tendency for the photosensitive layer to absorb light of a specific wavelength that is irradiated thereon during formation of the grating, if the outer diameter of the photosensitive layer is too large, when light is irradiated from the side surface of the optical fiber, sufficient light is not irradiated onto the portion of the photosensitive layer located on the opposite side to the light irradiation surface, and it is not possible for the refractive index to be raised sufficiently and, in some cases, the change in the refractive index is not uniform.

It is desirable that the grating length is between 1 and 100 mm. If it is less than 1 mm, then there is the concern that it is too short and the required transmission loss will not be obtained. If the grating length exceeds 100 mm, then not only are there difficulties in the formation of the grating portion, but the size of the device increases, which will cause problems when the device is housed in a module or the like.

Because the grating length has an effect on the optical characteristics such as the frequency band loss and the like, it is preferable that the grating length is suitably adjusted while considering the desired characteristics.

Providing the clad is provided with a photosensitive layer, this may be one layer or may be a multilayered structure formed from two or more layers, however, from the viewpoint of manufacturability, a multilayered structure of two or more layers is preferable. Furthermore, it is possible to alter as is appropriate conditions such as the doping amounts of photosensitive dopant and dopant for adjusting the refractive index in accordance with the design conditions. Moreover, in the present embodiment it is possible to manufacture the optical fiber used in the slant SPG by a known method such as the VAD method, the MCVD method, the PCVD method, or the like. The grating portion may be manufactured by a known method using an excimer laser or the like as the light source.

The standardized frequency V and the theoretical cutoff wavelength λc can be represented by Formula (5) below.

$$\lambda_c = \frac{V}{V_C}\lambda \quad (5)$$

In Formula (5) λc is the theoretical cutoff wavelength, Vc is a constant, namely, 2.4048256, and λ is the operating wavelength and in the present embodiment is, for example, between 1,500 and 1,600 nm, and is preferably 1,550 nm.

Accordingly, if the value of λc is determined by substituting the values for the standardized frequency V and the like in Formula (5), then it is possible to describe the conditions for the present invention using λc instead of the standardized frequency V.

Note that in many cases the cutoff wavelength of an actual slant SPG is evaluated not using the theoretical λc, but using an execution cutoff wavelength. The execution cutoff wavelength is determined by JIS C 6825, Section 8.2.3 and is a shorter value than the theoretical cutoff wavelength.

Note also that, in accordance with the above procedure, if a slant SPG is designed so that the conditions of at least one (preferably two or more and most preferably three) of Formulas (2) to (4) are satisfied, and this slant SPG manufactured, then it is possible to reliably obtain a slant SPG having the desired characteristics.

3. Concerning Slant SPG Applications:

Because the slant SPG of the first or second embodiment is a slant type of short-period grating, it has the advantage of little reflected light. Furthermore, by selecting the conditions, smooth spectrum characteristics with a narrow frequency band can be obtained. Moreover, by combining the above conditions it is possible to design SPG having a variety of optical characteristics.

Therefore, the present invention can be preferably applied to a gain equalizer that equalizes the wavelength dependency of the gain of an optical amplifier, and to construct an optical amplifier module provided with this optical amplifier and gain equalizer.

An Er doped optical fiber amplifier that uses an Er doped optical fiber is preferably used as the optical fiber amplifier because of its suitability for amplifying optical signals in the vicinity of the 1,550 nm wavelength.

Note that, conventionally, a long period grating or etalon or the like is used for this gain equalizer. For example, a plurality of long period gratings that each have light loss characteristics in a different wavelength region and that are connected in series are used to form a gain equalizer.

An optical fiber amplifier module is constructed by combining an Er doped optical fiber amplifier with the above type of gain equalizer.

Note that the loss peak that can be obtained using a single long period grating has a substantially triangular bell shape. Therefore, in the wavelength spectrum of the gain equalizer, a loss peak whose configuration is composed of a plurality of narrow, substantially triangular peaks arranged in a row is obtained.

Accordingly, in the wavelength spectrum of light transmitted through an optical fiber amplifier module, what is known as gain residue, which is where the gain was not able to be flattened, is present between the plurality of loss peaks.

There is also an optical communication system used for long distance transmissions in which a plurality of the above type of optical fiber amplifier modules are connected in series in multiple stages.

Note that an optical communication system is provided, at one end portion thereof, with a transmitting portion that emits optical signals and, at the other end portion thereof, with a receiving section that receives optical signals. An optical amplifier module is inserted into the optical transmission path connecting the transmitting portion and the receiving portion.

The gain residue that is generated by the transmission through each of the optical fiber amplifier modules forming this system is present in the respective same wavelength frequency bands.

Accordingly, the gain residue accumulates due to the transmission through each of the optical fiber amplifier modules and the transmission characteristics are affected.

Therefore, conventionally, an intensive equalizer is inserted every 10 to 20 optical fiber amplifier modules so as to remove the accumulated gain residue. This has caused problems with the cost of the device.

However, the slant SPG of the present invention enables an arbitrary transmission loss to be obtained compared with when an LPG is used. Therefore, if an optical fiber amplifier module is constructed by combining, for example, an Er doped optical fiber amplifier with the slant SPG of the present invention, then it is possible to equalize the gain of an Er doped optical fiber amplifier even more accurately, and to reduce gain residue.

As a result, it is possible to greatly reduce the number of intensive gain equalizers, thereby enabling a lowering in the cost of this optical communication system to be achieved.

Note that the wavelength frequency band of an Er doped optical fiber amplifier that requires gain equalization is between 10 nm and 45 nm.

Furthermore, the frequency band where a loss peak of a slant SPG with a fixed grating period may, for example, be between 5 nm and 10 nm.

In order to broaden this to the range of the 10 to 45 nm gain equalization frequency band of the Er doped optical fiber amplifier, it is preferable that a chirped pitch and fine adjustment be employed. It is sufficient if the chirping ratio is larger than 0, and, because of the gain equalization frequency band and the grating length, preferably not more than 20 nm/cm. Moreover, from the viewpoint of controllability of the filter configuration (i.e., the configuration of the loss peak), it is preferable if the chirping ratio is essentially 0.2 nm/cm or more.

This type of optical amplifier module can be applied to various optical communication systems. For example, when long distance wavelength division multiplexing is performed using dispersion shifted optical fibers and the like, this optical amplifier module can be applied to an optical communication system or the like by being inserted partway along the transmission path, and performing optical communication while amplifying the optical signal.

Industrial Applicability

As has been described above, by means of the present invention it is possible to provide a slant SPG which, in the wavelength spectrum of transmitted light, has a narrow loss frequency band, has reduced ghost mode peaks, and enables a reduction in side band transmission loss to be achieved.

As a result, because the free design of optical characteristics becomes possible, the present invention can be used to adjust the optical characteristics of various optical devices such as Er doped optical fiber amplifiers.

What is claimed is:

1. A slant short-period grating which is obtainable by irradiating light onto an optical fiber having a core and a clad provided on an outer periphery of the core, the core being formed from quartz glass to which has been doped a photosensitive dopant that changes a refractive index of the quartz glass by light irradiation, and the clad having one or two or more layers with at least the layer that is adjacent to the core being a photosensitive layer formed from quartz glass to which has been doped a photosensitive dopant that changes a refractive index of the quartz glass by light irradiation, and thereby a grating portion is formed by changing the refractive index of the photosensitive layer of the clad and the core at a predetermined grating period along a longitudinal direction of the optical fiber by a predetermined slant angle, wherein a diameter of the core is 5 μm or more;

wherein a relative photosensitivity ratio of the core relative to the photosensitive layer of the clad that is adjacent to the core satisfies Formula (1) below:

$$0.2-0.1 \cdot (V-1.7) \leq P \leq 0.1a\{0.41-0.33 \cdot (V-1.7)\} \quad (1)$$

in Formula (1), a is the diameter of the core in units of μm, V is a standardized frequency, and P is the relative photosensitivity ratio of the core relative to the photosensitive layer of the clad that is adjacent to the core; and wherein the slant angle is set to such an angle that loss due to coupling of a waveguide mode with a reflection mode is minimum.

2. A slant short-period grating according to claim 1, wherein the diameter of the core is 7 μm or more.

3. A slant short-period grating according to claim 1, wherein the relative photosensitive ratio of the core is 0.1 to 0.4.

4. A slant short-period grating according to claim 1, wherein an outer diameter of the photosensitive layer of the clad is four times or more the size of the diameter of the core.

5. A slant short-period grating according to claim 1, wherein the diameter of the core is 12 μm or less.

6. A slant short-period grating according to claim 1, wherein a comparative refractive index difference between the core and the clad is 0.5% or less.

7. A slant short-period grating according to claim 1, wherein aluminum or phosphorous is doped to the core.

8. A slant short-period grating which is obtainable by irradiating light onto an optical fiber having a core and a clad provided on an outer periphery of the core, the clad having one or two or more layers with at least one layer being a photosensitive layer formed from quartz glass to which has been doped a photosensitive dopant that changes a refractive index of the quartz glass by light irradiation, and thereby a grating portion is formed by changing the refractive index of the photosensitive layer at a predetermined grating period along a longitudinal direction of the optical fiber by a predetermined slant angle, wherein a relative photosensitivity ratio of the core relative to the photosensitive layer of the clad that has the highest photosensitivity satisfies Formula (2) below:

$$P \leq m_1 (V-2) + m_2$$

$$m_1 = 0.0041667a^4 - 0.13519a^3 + 1.6206a^2 - 8.511a + 16.291 \quad (2)$$

$$m_2 = -0.0083827a^2 + 0.18344a - 0.6912$$

however, when P equals 0 or smaller or is imaginary number, P is 0 in Formula (2), a is the diameter of the core in units of μm, V is a standardized frequency, and P is the relative photosensitivity ratio of the core relative to the photosensitive layer of the clad that has the highest photosensitivity.

9. A slant short-period grating which is obtainable by irradiating light onto an optical fiber having a core and clad provided on an outer periphery of the core, the clad having one or two or more layers with at least one layer being a photosensitive layer formed from quartz glass to which has been doped a photosensitive dopant that changes a refractive index of the quartz glass by light irradiation, and thereby a grating portion is formed by changing the refractive index of the photosensitive layer at a predetermined grating period along a longitudinal direction of the optical fiber by a predetermined slant angle, wherein a relative photosensitivity ratio of the core relative to the photosensitive layer of the clad that has the highest photosensitivity satisfies Formula (3) below:

$$P \geq (V-1.7868)^{0.048522} + 0.17416V - 1.121 \quad (3)$$

however, when P equals 0 or smaller or is imaginary number, P is 0 in Formula (3), a is the diameter of the core in units of μm, V is a standardized frequency, and P is the relative photosensitivity ratio of the core relative to the photosensitive layer of the clad that has the highest photosensitivity.

10. A slant short-period grating which is obtainable by irradiating light onto an optical fiber having a core and clad provided on an outer periphery of the core, the clad having one or two or more layers with at least one layer being a photosensitive layer formed from quartz glass to which has been doped a photosensitive dopant that changes a refractive index of the quartz glass by light irradiation, and thereby a grating portion is formed by changing the refractive index of the photosensitive layer at a predetermined grating period along a longitudinal direction of the optical fiber by a predetermined slant angle, wherein a relative photosensitivity ratio of the core relative to the photosensitive layer of the clad that has the highest photosensitivity satisfies Formula (4) below:

$$P \geq m1 (a-m2)^{m3}$$

$$m1 = -0.28947 + 0.17702V$$

$$m2 = -344.28 + 543.53V - 272.8V^2 + 44.494V^3 \quad (4)$$

$$m3 = 0.96687 - 0.24791V$$

however, when P equals 0 or smaller or is imaginary number, P is 0 in Formula (4), a is the diameter of the core in units of μm, V is a standardized frequency, and P is the relative photosensitivity ratio of the core relative to the photosensitive layer of the clad that has the highest photosensitivity.

11. A slant short-period grating according to any of claims 8 to 10, wherein the slant angle is set such that loss due to coupling of a waveguide mode with a reflection mode is minimum.

12. A slant short-period grating according to any of claims 8 to 10, wherein the relative sensitivity ratio of the core relative to the photosensitive layer is 0.2 or more.

13. A slant short-period grating according to any of claims 8 to 10, wherein the grating period is a chirped pitch, and the chirping ratio of the grating period is 20 nm/cm or less.

14. A slant short-period grating according to any of claims 1 to 10, wherein a bend loss of the optical fiber in conditions of a wavelength of 1,550 nm and a winding diameter of 60 mm is 1 dB/m or less.

15. A slant short-period grating according to any of claims 1 to 10, wherein a bend loss of the optical fiber in conditions of a wavelength of 1,550 nm and a winding diameter of 40 mm is 0.1 dB/m or less.

16. A slant short-period grating according to any of claims 1 to 10, wherein a mode field diameter of a waveguide mode of the optical fiber in an operating wavelength of the slant short-period fiber grating is 15 $\mu$m or less.

17. A slant short-period grating according to any of claims 1 to 10, wherein the outer diameter of the photosensitive layer is 1.5 times or more the size of the mode field diameter of a waveguide mode of the optical fiber in an operating wavelength of the slant short-period fiber grating.

18. A slant short-period grating according to any of claims 1 to 10, wherein the outer diameter of the photosensitive layer is 60 $\mu$m or less.

19. A slant short-period grating according to any of claims 1 to 10, wherein the length of the grating portion is 1 to 100 mm.

20. An optical amplifier module comprising the slant short-period grating according to any of claims 1 to 10 and an optical amplifier, wherein gain equalization of the optical amplifier is performed by the slant short-period grating.

21. An optical amplifier module according to claim 20, wherein the optical amplifier is an erbium doped optical fiber amplifier.

22. An optical communication system that employs the optical amplifier module according to claim 20.

23. A method for manufacturing a slant short-period grating in which a slant short-period grating is designed and manufactured such that the conditions described in any of claims 1 to 10 are satisfied.

* * * * *

UNITED STATES PATENT AND TRADEMARK OFFICE
CERTIFICATE OF CORRECTION

PATENT NO. : 6,836,418 B2
DATED : December 28, 2004
INVENTOR(S) : Akira Sakamoto et al.

It is certified that error appears in the above-identified patent and that said Letters Patent is hereby corrected as shown below:

<u>Title page,</u>
Item [30], Foreign Application Priorty Data, please add:
-- June 19, 2000 ......................................... (JP) 2000-183796 --.

Signed and Sealed this

Twelfth Day of April, 2005

JON W. DUDAS
*Director of the United States Patent and Trademark Office*